United States Patent
DeMartino et al.

(10) Patent No.: US 10,350,139 B2
(45) Date of Patent: *Jul. 16, 2019

(54) PHARMACEUTICAL GLASS PACKAGING ASSURING PHARMACEUTICAL STERILITY

(71) Applicant: CORNING INCORPORATED, Corning, NY (US)

(72) Inventors: Steven Edward DeMartino, Painted Post, NY (US); Robert Anthony Schaut, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 993 days.

This patent is subject to a terminal disclaimer.

(21) Appl. No.: 14/573,606

(22) Filed: Dec. 17, 2014

(65) Prior Publication Data

US 2015/0157533 A1    Jun. 11, 2015

Related U.S. Application Data

(63) Continuation-in-part of application No. 13/778,975, filed on Feb. 27, 2013, and a continuation-in-part of
(Continued)

(51) Int. Cl.
*A61J 1/00* (2006.01)
*B65D 1/02* (2006.01)
(Continued)

(52) U.S. Cl.
CPC ............... *A61J 1/00* (2013.01); *B32B 17/06* (2013.01); *B65D 1/0215* (2013.01);
(Continued)

(58) Field of Classification Search
CPC ........ A61J 1/00; C03C 21/002; C03C 21/007; B32B 17/06; B65D 1/0215
See application file for complete search history.

(56) References Cited

U.S. PATENT DOCUMENTS

| 1,115,972 A | 11/1914 | Potter |
| 2,344,630 A | 3/1944 | Mylchreest |
(Continued)

FOREIGN PATENT DOCUMENTS

| CN | 101717189 A | 6/2010 |
| DE | 29702816 U1 | 4/1997 |
(Continued)

OTHER PUBLICATIONS

"Schott Cartridges" as published online on Nov. 5, 2012 and acquired from https://www.adelphi-hp.com/assets/files/SCHOTT/schott-cartridges.pdf. via the google search https://www.google.com/search?q=schott+injector+cartridge&source=lnt&tbs=cdr%3A1%2Ccd_min%3A%2Ccd_max%3A12-16-2013&tbm=.*
(Continued)

*Primary Examiner* — Gerard Higgins
(74) *Attorney, Agent, or Firm* — Michael G. Panian

(57) ABSTRACT

A sterile glass pharmaceutical container or vessel such as, but not limited to, vials for holding pharmaceutical products or vaccines in a hermetic and/or sterile state. The sterile glass pharmaceutical container undergoes a strengthening process that produces compression at the surface and tension within the container wall. The strengthening process is designed such that the tension within the wall is great enough to ensure catastrophic failure of the pharmaceutical container, thus rendering the product unusable, should sterility be compromised by a through-wall crack. The tension is greater than a threshold central tension, above which catastrophic failure of the pharmaceutical container is guaranteed, thus eliminating any potential for violation of pharmaceutical integrity or sterility (such as stable cracks) in the glass packaging which are not easily identifiable in an otherwise seemingly intact pharmaceutical container.

31 Claims, 9 Drawing Sheets

Related U.S. Application Data application No. 13/660,680, filed on Oct. 25, 2012, now Pat. No. 9,474,688.

(60) Provisional application No. 61/604,647, filed on Feb. 29, 2012, provisional application No. 61/551,163, filed on Oct. 25, 2011.

(51) Int. Cl.
*B32B 17/06* (2006.01)
*C03C 21/00* (2006.01)
*C03B 27/06* (2006.01)

(52) U.S. Cl.
CPC .......... *C03C 21/002* (2013.01); *C03C 21/007* (2013.01); *C03B 27/065* (2013.01); *Y10T 29/49* (2015.01); *Y10T 428/131* (2015.01); *Y10T 428/1317* (2015.01); *Y10T 428/24802* (2015.01); *Y10T 428/315* (2015.01)

(56) References Cited

U.S. PATENT DOCUMENTS

| | | |
|---|---|---|
| 3,490,885 A | 1/1970 | Hammer |
| 3,728,095 A | 4/1973 | Grubb et al. |
| 3,772,135 A | 11/1973 | Hara et al. |
| 3,844,754 A | 10/1974 | Grubb et al. |
| 3,844,758 A | 10/1974 | Wartenberg |
| 3,900,329 A | 8/1975 | Grubb et al. |
| 4,021,218 A | 5/1977 | Watanabe |
| 4,065,317 A | 12/1977 | Baak et al. |
| 4,689,085 A | 8/1987 | Plueddemann |
| 4,842,630 A | 6/1989 | Braithwaite et al. |
| 4,913,720 A | 4/1990 | Gardon et al. |
| 5,114,757 A | 5/1992 | Linde et al. |
| 5,286,527 A | 2/1994 | Blum et al. |
| 5,547,929 A | 8/1996 | Anderson, Jr. et al. |
| 5,547,933 A | 8/1996 | Lin |
| 5,559,060 A | 9/1996 | Dumbaugh, Jr. et al. |
| 5,580,755 A | 12/1996 | Souza |
| 5,582,823 A | 12/1996 | Souza |
| 5,605,690 A | 2/1997 | Jacobs et al. |
| 5,656,722 A | 8/1997 | Dorschug |
| 5,721,181 A | 2/1998 | Sehgal et al. |
| 5,736,476 A | 4/1998 | Watzke et al. |
| 5,756,349 A | 5/1998 | Lin |
| 5,824,784 A | 10/1998 | Kinstler et al. |
| 5,854,153 A | 12/1998 | Kohli |
| 5,955,422 A | 9/1999 | Lin |
| RE36,755 E | 6/2000 | Smith et al. |
| 6,096,432 A | 8/2000 | Sakaguchi et al. |
| 6,214,429 B1 | 4/2001 | Zou et al. |
| 6,472,068 B1 | 10/2002 | Glass et al. |
| 6,518,211 B1 | 2/2003 | Bradshaw et al. |
| 6,561,275 B2 | 5/2003 | Glass et al. |
| 6,630,420 B1 | 10/2003 | Naumann et al. |
| 6,794,323 B2 | 9/2004 | Peuchert et al. |
| 6,818,576 B2 | 11/2004 | Ikenishi et al. |
| RE38,743 E | 6/2005 | Debrie |
| 6,939,819 B2 | 9/2005 | Usui et al. |
| 7,087,307 B2 | 8/2006 | Nagashima et al. |
| 7,315,125 B2 | 1/2008 | Kass |
| 7,470,999 B2 | 12/2008 | Saito et al. |
| 7,476,652 B2 | 1/2009 | Brunner-Schwarz et al. |
| 7,915,225 B2 | 3/2011 | Finck |
| 8,551,898 B2 | 10/2013 | Danielson et al. |
| 8,753,994 B2 | 6/2014 | Danielson et al. |
| 9,517,966 B2* | 12/2016 | Danielson ............... C03C 3/087 |
| 2004/0096588 A1 | 5/2004 | Brandt |
| 2004/0105798 A1* | 6/2004 | Windsheimer ............ A61L 2/04 422/308 |
| 2006/0154891 A1 | 7/2006 | Schridde et al. |
| 2007/0004580 A1 | 1/2007 | Kass |
| 2007/0065366 A1 | 3/2007 | Soliani Raschini et al. |
| 2007/0123410 A1 | 5/2007 | Morena et al. |
| 2007/0157919 A1 | 5/2007 | Marandon |
| 2007/0191207 A1 | 8/2007 | Danielson et al. |
| 2008/0281260 A1 | 11/2008 | William et al. |
| 2008/0308444 A1 | 12/2008 | McClain et al. |
| 2009/0163342 A1 | 6/2009 | Kolberg et al. |
| 2009/0197088 A1 | 8/2009 | Murata |
| 2009/0275462 A1 | 11/2009 | Murata |
| 2009/0325776 A1 | 12/2009 | Murata |
| 2010/0035038 A1 | 2/2010 | Barefoot et al. |
| 2010/0035745 A1 | 2/2010 | Murata |
| 2010/0047521 A1 | 2/2010 | Amin et al. |
| 2010/0120603 A1 | 5/2010 | Morena et al. |
| 2010/0255061 A1 | 10/2010 | de Juan, Jr. et al. |
| 2010/0317506 A1 | 12/2010 | Fechner et al. |
| 2011/0014475 A1 | 1/2011 | Murata |
| 2011/0017297 A1 | 1/2011 | Aitken et al. |
| 2011/0045960 A1 | 2/2011 | Fechner et al. |
| 2011/0045961 A1 | 2/2011 | Dejneka et al. |
| 2011/0071012 A1 | 2/2011 | Kondo et al. |
| 2011/0062619 A1 | 3/2011 | Laine et al. |
| 2011/0091704 A1 | 4/2011 | Akiba et al. |
| 2011/0098172 A1 | 4/2011 | Brix |
| 2011/0123832 A1 | 5/2011 | Matsumoto et al. |
| 2011/0159318 A1 | 6/2011 | Endo et al. |
| 2011/0177987 A1 | 7/2011 | Lenting et al. |
| 2011/0274916 A1 | 11/2011 | Murata |
| 2012/0199203 A1 | 8/2012 | Nishizawa et al. |
| 2012/0208309 A1 | 8/2012 | Tsujimura et al. |
| 2012/0297829 A1 | 11/2012 | Endo et al. |
| 2013/0004758 A1 | 1/2013 | Dejneka et al. |
| 2013/0011650 A1 | 1/2013 | Akiba et al. |
| 2013/0101596 A1 | 4/2013 | DeMartino et al. |
| 2013/0101764 A1 | 4/2013 | Schaut et al. |
| 2013/0101766 A1 | 4/2013 | Danielson et al. |
| 2013/0101853 A1 | 4/2013 | Drake et al. |
| 2013/0196094 A1 | 8/2013 | Weeks et al. |
| 2013/0196095 A1 | 8/2013 | Weeks et al. |
| 2013/0196096 A1 | 8/2013 | Weeks et al. |
| 2013/0196097 A1 | 8/2013 | Weeks et al. |
| 2013/0202823 A1 | 8/2013 | Weeks et al. |
| 2013/0213848 A1 | 8/2013 | Weeks et al. |
| 2013/0216742 A1 | 8/2013 | DeMartino et al. |
| 2014/0023865 A1 | 1/2014 | Comte et al. |
| 2014/0120279 A1* | 5/2014 | DeMartino ............... A61J 1/00 428/34.6 |

FOREIGN PATENT DOCUMENTS

| | | |
|---|---|---|
| DE | 102004011009 A1 | 9/2005 |
| EP | 0515801 A1 | 12/1992 |
| EP | 1074521 A2 | 2/2001 |
| EP | 2031124 A1 | 3/2009 |
| EP | 2540682 A1 | 1/2013 |
| GB | 966731 A | 8/1964 |
| GB | 1115972 | 6/1968 |
| GB | 2335423 A | 9/1999 |
| IN | 231117 | 3/2009 |
| JP | 7223845 | 8/1995 |
| JP | 11314931 | 11/1999 |
| JP | 2000007372 A | 1/2000 |
| JP | 2001180969 A | 7/2001 |
| JP | 2001192239 A | 7/2001 |
| JP | 2001229526 A | 8/2001 |
| JP | 2001236634 A | 8/2001 |
| JP | 2002003241 A | 1/2002 |
| JP | 2002025762 A | 1/2002 |
| JP | 2002249340 A | 9/2002 |
| JP | 2004131314 A | 4/2004 |
| JP | 2008195602 A | 8/2008 |
| JP | 2010059038 A | 3/2010 |
| RO | 83460 A2 | 3/1984 |
| SU | 990700 A1 | 1/1983 |
| WO | 1997/25932 A1 | 7/1997 |
| WO | 2007025932 A2 | 3/2007 |
| WO | 2008050500 A1 | 5/2008 |
| WO | 2008143999 A1 | 11/2008 |
| WO | 2009002660 A2 | 12/2008 |
| WO | 2009097123 | 8/2009 |
| WO | 2010084670 A1 | 7/2010 |

(56) References Cited

FOREIGN PATENT DOCUMENTS

| WO | 2011049146 A1 | 4/2011 |
|---|---|---|
| WO | 2011069338 A1 | 6/2011 |
| WO | 2011103798 A1 | 9/2011 |
| WO | 2011103799 A1 | 9/2011 |
| WO | 2011145661 A1 | 11/2011 |
| WO | 2012026290 A1 | 3/2012 |
| WO | 2012124757 A1 | 9/2012 |
| WO | 2013063290 A1 | 5/2013 |

OTHER PUBLICATIONS

Adams RA. Formal discussion: the role of transplantation in the experimental investigation of human leukemia and lymphoma. Cancer Res. Dec. 1967;27(12):2479-82.
Beum PV et al., Three new assays for rituximab based on its immunological activity or antigenic properties: analyses of sera and plasmas of RTX-treated patients with chronic lymphocytic leukemia and other B cell lymphomas. J Immunol Methods. Jun. 2004;289(1-2):97-109.
Brunner KT et al. Quantitative assay of the lytic action of immune lymphoid cells on 51-Cr-labelled allogeneic target cells in vitro; inhibition by isoantibody and by drugs. Immunology. Feb. 1968;14(2):181-96.
Casset et al., "A peptide mimetic of an anti-CD4 monoclonal antibody by rational design", Biochem Biophys Res Commun. Jul. 18, 2003; vol. 307, No. 1, pp. 198-205.
Cortez-Retamozo et al., Efficient cancer therapy with a nanobody-based conjugate, Cancer Research, Apr. 15, 2004, vol. 64, No. 8, pp. 2853-2857.
Fassina, G., "Complementary peptides as antibody mimetics for protein purification and assay", Immunomethods, Oct. 1994; vol. 5, No. 2, pp. 121-129.
Lichtlen P, Lam TT, Nork TM, Streit T, Urech DM. Relative contribution of VEGF and TNF-alpha in the cynomolgus laser-induced CNV model: comparing the efficacy of bevacizumab, adalimumab, and SBA105. Invest Ophthalmol Vis Sci. Sep. 2010;51(9):4738-45.
Murphy, D. B. and Davidson, M. W., "Differential Interference Contrast (DIC) Microscopy and Modulation Contrast" form Fundamentals of Light Microscopy and Electronic Imaging Published 2001, Publisher, Wiley, pp. 153-168.
Reynolds et al., "Glass Delamination and Breakage", Bioprocess International, Dec. 1, 2011, vol. 9, No. 11, pp. 52-57.
Saragovi et al., "Design and synthesis of a mimetic from an antibody complementarity-determining region", Science, Aug. 16, 1991, vol. 253, No. 5021, pp. 792-795.
U.S. Food and Drug Administration, Package Insert HUMIRA (adalimumab) Abbott Laboratories, 2010.
Wen, Zai-Qing et al., "Nondestructive detection of glass vial inner surface morphology with differential interference contrast microscopy", Journal of Pharmaceutical Sciences, Apr. 2012, vol. 101, Issue 4, pp. 1378-1384.
International Search Report & Written Opinion dated Jul. 11, 2013 for PCT/US2013/028184 filed Feb. 28, 2013.
International Preliminary Report on Patentability dated Sep. 12, 2014 for International Patent Application No. PCTUS2013/028184 filed Feb. 28, 2013, pp. 1-10.
Australian First Examination Report dated Nov. 13, 2015 for AU Patent Application No. 2013226031, pp. 1-2.
Varshneya, AK. "Chemical strengthening of glass: Lessons learned and yet to be learned", International journal of applied glass science. vol. 1, No. 2, 2010, pp. 131-142.
Barrowcliffe TW, et al., Anticoagulant activities of lung and mucous heparins. Thromb Res. Jan. 1978;12(1):27-36.
Corrected Notice of Allowance dated Sep. 11, 2013, relating to U.S. Appl. No. 13/660,394, filed Oct. 25, 2012.
Cotes PM, et al., Bio-assay of erythropoietin in mice made polycythaemic by exposure to air at a reduced pressure. Nature. Sep. 9, 1961;191:1065-7.
Database WPI Week 198434 Thomsen Scientific, London, GB; AN 1984-211366 XP002690017.
Davis-Smyth T et al., The second immunoglobulin-like domain of the VEGF tyrosine kinase receptor Flt-1 determines ligand binding and may initiate a signal transduction cascade. EMBO J. Sep. 16, 1996;15(18):4919-27.
Drugs.com, Enbrel, May 28, 2010.
Drugs.com, Neulasta®, Sep. 13, 2010.
Ferrara N, et al., Vascular endothelial growth factor is essential for corpus luteum angiogenesis. Nat Med. Mar. 1998;4(3):336-40.
Goldwasser E, et al., An assay for erythropoietin in vitro at the milliunit level. Endocrinology. Aug. 1975;97(2):315-23.
Hammond D, et al., Production, utilization and excretion of erythropoietin. I. Chronic anemias. II. Aplastic crisis. 3. Erythropoietic effects of normal plasma. Ann N Y Acad Sci. Mar. 29, 1968;149(1):516-27.
Holash J, et al., VEGF-Trap: a VEGF blocker with potent antitumor effects. Proc Natl Acad Sci U S A. Aug. 20, 2002;99(17):11393-8.
Horton RM et al., Engineering hybrid genes without the use of restriction enzymes: gene splicing by overlap extension. Gene. Apr. 15, 1989;77(1):61-8.
Humana Abbreviated Formulary List of Covered Drugs, 2010 Prescription Drug Guide.
International Search Report & Written Opinion relating to PCT/US2012/061940 filed Oct. 25, 2012; dated Jan. 30, 2013.
International Search Report & Written Opinion relating to PCT/US2012/061943 filed Oct. 25, 2012; dated Jan. 30, 2013.
International Search Report & Written Opinion relating to PCT/US2012/061946 filed Oct. 25, 2012; dated Jan. 30, 2013.
International Search Report & Written Opinion relating to PCT/US2012/061949 filed Oct. 25, 2012; dated Jan. 30, 2013.
International Search Report & Written Opinion relating to PCT/US2012/061953 filed Oct. 25, 2012; dated Jan. 30, 2013.
International Search Report & Written Opinion relating to PCT/US2012/061956 filed Oct. 25, 2012; dated Jan. 30, 2013.
International Search Report & Written Opinion relating to PCT/US2012/061958 filed Oct. 25, 2012; dated Jan. 30, 2013.
International Search Report & Written Opinion relating to PCT/US2013/048589 filed Jun. 28, 2013; dated Oct. 28, 2013.
International Search Report relating to PCT/US2012/061867; dated Jan. 30, 2013.
International Search Report relating to PCT/US2012/061939; dated Jan. 30, 2013.
IPRP & Written Opinion relating to PCT/US2012/061940 filed Oct. 25, 2012; dated May 8, 2014.
IPRP & Written Opinion relating to PCT/US2012/061943 filed Oct. 25, 2012; dated May 8, 2014.
IPRP & Written Opinion relating to PCT/US2012/061946 filed Oct. 25, 2012; dated May 8, 2014.
IPRP & Written Opinion relating to PCT/US2012/061949 filed Oct. 25, 2012; dated May 8, 2014.
IPRP & Written Opinion relating to PCT/US2012/061953 filed Oct. 25, 2012; dated May 8, 2014.
IPRP & Written Opinion relating to PCT/US2012/061956, filed Oct. 25, 2012; dated May 8, 2014.
IPRP & Written Opinion relating to PCT/US2012/061958 filed Oct. 25, 2012; dated May 8, 2014.
Karch, AM, "2006 Lippincott's Nursing Drug Guide," Publisher: Lippincott Williams & Wilkins, ISBN: 1582554382, 2006.
Lane DA, et al., Anticoagulant activities of four unfractionated and fractionated heparins. Thromb Res. Feb. 1978;12(2):257-71.
Machine translation CN101717189 Abstract.
Machine translation DE102004011009.
Machine translation JP2002025762 Abstract.
Machine translation JP2004131314.
Metcalf D. Clonal extinction of myelomonocytic leukemic cells by serum from mice injected with endotoxin. Int J Cancer. Feb. 15, 1980;25(2):225-33.
Non-Final Office Action dated Mar. 14, 2013, relating to U.S. Appl. No. 13/660,394, filed Oct. 25, 2012.
Notice of Allowance dated Jun. 27, 2013, relating to U.S. Appl. No. 13/660,394, filed Oct. 25, 2012.

(56) References Cited

OTHER PUBLICATIONS

Pharmaceutical Drug Manufacturers, Erythropoietin Injection, Sep. 18, 2008.
Randle PJ., "Assay of plasma insulin activity by the rat-diaphragm method", British Medical Journal, May 29, 1954, vol. 1 (4873), pp. 1237-1240.
Ribel U, Subcutaneous absorption of insulin analogues. In Frontiers in Insulin Pharmacology, Berger M, Gries FA (eds), Thieme Verlag, pp. 70-77 (1993).
Ribel U., et al., The pig as a model for subcutaneous insulin absorption in man. Serrano_Rios, M and Lefebvre, P.J. 891-896. 1985. Amsterdam; New York; Oxford, Elsevier Science Publishers. 1985 (Conference Proceeding).
Roche Consumer Medicine Information, Neupogen®, Feb. 3, 2010.
Silva M, et al., Erythropoietin can induce the expression of bcl-x(L) through Stat5 in erythropoietin-dependent progenitor cell lines. J Biol Chem. Aug. 6, 1999;274(32):22165-9.
Teien AN, et al., Evaluation of an amidolytic heparin assay method: increased sensitivity by adding purified antithrombin III. Thromb Res. Mar. 1977;10(3):399-410.
Ternant D, et al., An enzyme-linked immunosorbent assay for therapeutic drug monitoring of infliximab. Ther Drug Monit. Apr. 2006;28(2):169-74.
Ueda et al., "Age-dependent changes in phenotypes and candidate gene analysis in a polygenic animal model of Type II diabetes mellitus; NSY mouse" Diabetologia, Jul. 2000, vol. 43, Issue 7, pp. 932-938.
Yu L et al., Interaction between bevacizumab and murine VEGF-A: a reassessment. Invest Ophthalmol Vis Sci. Feb. 2008;49(2):522-7.

* cited by examiner

PHARMACEUTICAL GLASS PACKAGING ASSURING PHARMACEUTICAL STERILITY

CROSS-REFERENCE TO RELATED APPLICATIONS

This application is a continuation-in-part of U.S. patent application Ser. No. 13/778,975 filed on Feb. 27, 2013, which claims the priority of Provisional Application No. 61/604,647 filed Feb. 29, 2012, and U.S. patent application Ser. No. 13/660,680 filed on Oct. 25, 2012, which claims the benefit of 61/551,163 filed Oct. 25, 2011, the content of which is relied upon and incorporated herein by reference in its entirety, and the benefit of priority under 35 U.S.C. § 120 is hereby claimed.

FIELD OF THE INVENTION

The present specification generally relates to pharmaceutical containers and, more specifically, to chemically and mechanically durable pharmaceutical containers that are formed of a glass composition in a manner that substantially assures the sterility of the pharmaceutical.

BACKGROUND

A concern for food and drug manufacturers is maintaining the sterility of package contents from failing during transport and storage until patient use. Historically, glass has been used as the preferred material for packaging pharmaceuticals because of its hermeticity, optical clarity and excellent chemical durability relative to other materials. However, use of glass for such applications is limited by the mechanical performance of the glass. While glass containers are superior to many alternative materials, they are not unbreakable and occasionally experience damage from handling and transport. Specifically, in the pharmaceutical industry, glass breakage is a safety concern for the end user as the broken package and/or the contents of the package may injure the end user. Cracks that extend through the wall thickness may form, compromising sterility of the pharmaceutical contents but not leading to catastrophic failure of the package. Such cracks may result in recalls when detected by a health care professional or end consumer at the point of use, and can be costly to the pharmaceutical manufacturer.

SUMMARY

Accordingly, one aspect of the disclosure is to provide a strengthened glass pharmaceutical container such as, but not limited to, vials for holding pharmaceutical products or vaccines in a hermetic and/or sterile state. The strengthened glass container undergoes a strengthening process that produces compression at the surface and tension within the container wall. The strengthening process is designed such that the tension within the wall is great enough to ensure catastrophic failure of the container, thus rendering the product unusable, should sterility be compromised by a through-wall crack. The tension is greater than a threshold central tension, above which catastrophic failure of the container is enhanced, thus significantly reducing or eliminating any potential for violation of container integrity.

A sterile container comprising a glass, the container having a thickness and first surface and a second surface, the glass has a first region under a compressive stress, the first region extending from at least one of the first surface and the second surface to a depth of layer in the glass, wherein the depth of layer is greater than any flaw population created in the container during its manufacture, and a second region under a central tension, the second region extending from the depth of layer, and wherein the glass container remains sterile so long as a flaw does not extend into the second region.

A second aspect of the disclosure is to provide a sterile pharmaceutical container comprising a delamination resistant glass composition, the pharmaceutical container comprising a sterile pharmaceutical composition comprising an active pharmaceutical ingredient. The sterile pharmaceutical container has a first surface and a second surface separated by glass having a thickness, a first region under a compressive stress, the first region extending from at least one of the first surface and the second surface to a depth of layer in the glass of at least about 10 μm, and a second region under a central tension of at least about 15 MPa, the second region extending from the depth of layer, wherein the central tension is greater than a threshold central tension that is sufficient to allow self-propagation of a crack front greater than the depth of layer from the first surface to the second surface which renders the pharmaceutical container unsuitable for its intended use such that the active pharmaceutical ingredient remains sterile so long as the crack front does not extend into the second region.

A third aspect of the disclosure is to provide a sterile pharmaceutical composition comprising an active pharmaceutical ingredient selected from the group consisting of the pharmaceutical compositions set forth in Table 2 or 3, a pharmaceutically acceptable excipient. The pharmaceutical composition is contained within a sterile glass pharmaceutical container comprising a first surface and a second surface separated by glass having a thickness, a first region under a compressive stress, the first region extending from at least one of the first surface and the second surface to a depth of layer in the glass of at least about 10 μm, and a second region under a central tension of at least about 15 MPa, the second region extending from the depth of layer, wherein the central tension is greater than a threshold central tension that is sufficient to allow self-propagation of a crack front greater than the depth of layer from the first surface to the second surface which renders the pharmaceutical container unsuitable for its intended use such that the active pharmaceutical ingredient remains sterile so long as the crack front does not extend into the second region.

A fourth aspect of the disclosure is to provide a pharmaceutical container further including a pharmaceutical composition having an active pharmaceutical ingredient. In a particular embodiment, the pharmaceutical composition includes a citrate or phosphate buffer, for example, sodium citrate, SSC, monosodium phosphate or disodium phosphate. Alternatively or in addition, the pharmaceutical composition has a pH between about 7 and about 11, between about 7 and about 10, between about 7 and about 9, or between about 7 and about 8.

In one embodiment, the active pharmaceutical ingredient is an antidiabetic. Exemplary antidiabetics include insulin aspart, insulin degludec, insulin glargine recombinant, dulaglutide, lixisenatide, hyaluronidase (human), insulin, insulin degludec, liraglutide, insulin glargine, lixisenatide, albiglutide, insulin glargine recombinant, insulin lispro recombinant, insulin aspart, insulin (human), insulin detemir, exenatide synthetic, and Liraglutide.

In another embodiment, the active pharmaceutical ingredient is an antineoplastic, for example an antineoplastic MAb. Exemplary antineoplastics include Bavituximab, Onartuzumab, yttrium Y-90 clivatuzumab tetraxetan, obinutuzumab, cixutumumab, necitumumab, pertuzumab, brentuximab vedotin, nivolumab, trastuzumab emtansine, siltuximab, elotuzumab, ramucirumab, trastuzumab emtansin, Ipilimumab, Rituximab, Trastuzumab, Pertuzumab, and bevacizumab.

In one embodiment, the active pharmaceutical ingredient is an antirheumatic. Exemplary antirheumatics include tabalumab, sarilumab, Tocilizumab, Infliximab, Etanercept, Abatacept, certolizumab pegol, Infliximab, Golimumab, and Adalimumab.

In one embodiment, the active pharmaceutical ingredient is an antibacterial. Exemplary antibacterials include ceftolozane sulfate, tazobactam sodium, ceftaroline fosamil, brilacidin, brilacidin, and tedizolid phosphate.

In one embodiment, the active pharmaceutical ingredient is a cytostatic. Exemplary cytostatics include CT-107, ganetespib, CUDC-101, Reolysin, AEZS-108, velimogene aliplasmid, imetelstat sodium, algenpantucel-L, retaspimycin hydrochloride, astuprotimut-R, vosaroxin, BiovaxlD, iniparib, Bortezomib, and carfilzomib.

In one embodiment, the active pharmaceutical ingredient is a vaccine. Exemplary vaccines include meningococcal B vaccine, influenza vaccine, herpes zoster vaccine, hepatitis B vaccine, human papillomavirus (HPV) vaccine, pneumococcal vaccine, DTPw, influenza vaccine, hepatitis A and B vaccine, DTP, and hepatitis B and polio vaccine.

In one embodiment, the active pharmaceutical ingredient is an immunosuppressant. Exemplary immunosuppresants include epratuzumab, eritoran tetrasodium, blisibimod, and ustekinumab.

In one embodiment, the active pharmaceutical ingredient is an anti-fibrinolytic. Exemplary anti-fibrinolytics include turoctocog alfa, vonicog alfa, factor VIII, eptacog alfa, and octocog alfa.

In one embodiment, the active pharmaceutical ingredient is an eye preparation. Exemplary eye preparations include Ocriplasmin, Ranibizumab, Aflibercept, and Ranibizumab.

In one embodiment, the active pharmaceutical ingredient is a MS therapeutic. Exemplary MS therapeutics include Alemtuzumab, ocrelizumab, daclizumab, peginterferon beta-1a, interferon beta-1a, Natalizumab, glatiramer acetate, and interferon beta-1a.

In one embodiment, the active pharmaceutical ingredient is a bone calcium regulator. Exemplary bone calcium regulators include romosozumab, Denosumab, and recombinant human teriparatide In one embodiment, the active pharmaceutical ingredient is an anti-coagulant. Exemplary anti-coagulants include semuloparin sodium, otamixaban, and enoxaparin sodium.

In one embodiment, the active pharmaceutical ingredient is an anti-psychotic. Exemplary anti-psychotics include aripiprazole.

In one embodiment, the active pharmaceutical ingredient is an anti-metabolite. Exemplary anti-metabolites include gemcitabine elaidate.

In one embodiment, the active pharmaceutical ingredient is a radiopharmaceutical. Exemplary radiopharmaceuticals include radium Ra-223 chloride.

In one embodiment, the active pharmaceutical ingredient is an immunostimulant. Exemplary immunostimulants include Pegfilgrastim.

In one embodiment, the active pharmaceutical ingredient is a cytotoxic antibiotic. Exemplary cytotoxic antibiotic include doxorubicin hydrochloride.

In one embodiment, the active pharmaceutical ingredient is a cerebral and peripheral vasotherapeutic. Exemplary cerebral and peripheral vasotherapeutics include defibrotide.

In one embodiment, the active pharmaceutical ingredient is a musculoskeletal agent. Exemplary musculoskeletal agents include Drisapersen, eteplirsen, and asfotase alfa.

In one embodiment, the active pharmaceutical ingredient is a nootropic. Exemplary nootropic include solanezumab.

In one embodiment, the active pharmaceutical ingredient is a CNS drug. Exemplary CNS drugs include neural stem cells.

In one embodiment, the active pharmaceutical ingredient is a dermatological. Exemplary dermatologicals include secukinumab.

In one embodiment, the active pharmaceutical ingredient is an angiotensin II antagonist. Exemplary angiotensin II antagonist include serelaxin.

In one embodiment, the active pharmaceutical ingredient is an anti-spasmodic or anti-cholinergic. Exemplary antispasmodic or anti-cholinergics include teduglutide.

In one embodiment, the active pharmaceutical ingredient is an interferon. Exemplary interferons include peginterferon lambda-1a.

In one embodiment, the active pharmaceutical ingredient is an anti-anaemic. Exemplary anti-anaemics include ferric pyrophosphate and arbepoetin alfa.

In one embodiment, the active pharmaceutical ingredient is an anti-psoriasis agent. Exemplary anti-psoriasis agents include ixekizumab.

In one embodiment, the active pharmaceutical ingredient is an antihyperlipidaemic. Exemplary anti-hyperlipidaemics include alirocumab.

In one embodiment, the active pharmaceutical ingredient is a cardiac therapeutic. Exemplary cardiac therapeutics include cenderitide.

In one embodiment, the active pharmaceutical ingredient is an alkylating agent. Exemplary alkylating agents include palifosfamide.

In one embodiment, the active pharmaceutical ingredient is a bronchodilator. Exemplary bronchodilators include lebrikizumab.

In one embodiment, the active pharmaceutical ingredient is a gastro-intestinal anti-inflammatory. Exemplary gastrointestinal anti-inflammatories include vedolizumab.

In one embodiment, the active pharmaceutical ingredient is a growth hormone.

In one embodiment, the active pharmaceutical ingredient is a hormone preparation. Exemplary hormone preparations include parathyroid hormone 1-84.

In one embodiment, the active pharmaceutical ingredient is a non-narcotic analgesic. Exemplary non-narcotic analgesics include fulranumab.

In one embodiment, the active pharmaceutical ingredient is a diagnostic imaging agent. Exemplary diagnostic imaging agents include Minretumomab.

In one embodiment, the active pharmaceutical ingredient is a haematological. Exemplary haematologicals include Eculizumab.

In one embodiment, the active pharmaceutical ingredient is a peripheral muscle relaxant. Exemplary peripheral muscle relaxants include botulinum toxin type A.

In one embodiment, the active pharmaceutical ingredient is an interferon. Exemplary interferons include peginterferon alfa-2a.

In one embodiment, the active pharmaceutical ingredient is elosulfase alfa, Protectan CBLB502, HGT-1410, HGT 1110, or sebelipase alfa.

In one aspect, the present invention is directed to a delamination resistant pharmaceutical container formed, at least in part, of a glass composition including from about 70 mol. % to about 80 mol. % $SiO_2$; from about 3 mol. % to about 13 mol. % alkaline earth oxide; X mol. % $Al_2O_3$; and Y mol. % alkali oxide, wherein the alkali oxide comprises $Na_2O$ in an amount greater than about 8 mol. %, a ratio of Y:X is greater than 1, and the glass composition is free of boron and compounds of boron.

In one embodiment, the $SiO_2$ is present in an amount less than or equal to 78 mol. %.

In one embodiment, the amount of the alkaline earth oxide is greater than or equal to about 4 mol. % and less than or equal to about 8 mol. %. In a particular embodiment, the alkaline earth oxide includes MgO and CaO and has a ratio (CaO (mol. %)/(CaO (mol. %)+MgO (mol. %))) that is less than or equal to 0.5. In a particular embodiment, the alkaline earth oxide includes from about 0.1 mol. % to less than or equal to about 1.0 mol. % CaO. In a particular embodiment, the alkaline earth oxide includes from about 3 mol. % to about 7 mol. % MgO.

In another embodiment, the alkali oxide includes greater than or equal to about 9 mol. % $Na_2O$ and less than or equal to about 15 mol. % $Na_2O$. In another embodiment, the alkali oxide further includes $K_2O$ in an amount less than or equal to about 3 mol. %. In a particular embodiment, the alkali oxide includes $K_2O$ in an amount greater than or equal to about 0.01 mol. % and less than or equal to about 1.0 mol. %.

In one embodiment, X is greater than or equal to about 2 mol. % and less than or equal to about 10 mol. %. In a particular embodiment, the ratio of Y:X is less than or equal to 2. In a particular embodiment, the ratio of Y:X is greater than or equal to 1.3 and less than or equal to 2.0.

In another embodiment, the glass composition is free of phosphorous and compounds of phosphorous.

In one embodiment, the glass composition has a type HGB1 hydrolytic resistance according to ISO 719. Alternatively or in addition, the glass composition has a type HGA1 hydrolytic resistance according to ISO 720 after ion exchange strengthening. Alternatively or in addition, the glass composition has a type HGA1 hydrolytic resistance according to ISO 720 before and after ion exchange strengthening. Alternatively or in addition, the glass composition has at least a class S3 acid resistance according to DIN 12116. Alternatively or in addition, the glass composition has at least a class A2 base resistance according to ISO 695.

In one embodiment, the glass composition is ion exchange strengthened.

In another embodiment, the composition further includes a compressive stress layer with a depth of layer greater than or equal to 10 μm and a surface compressive stress greater than or equal to 250 MPa.

In another aspect, the present invention provides a delamination resistant pharmaceutical container formed, at least in part, of a glass composition including from about 72 mol. % to about 78 mol. % $SiO_2$; from about 4 mol. % to about 8 mol. % alkaline earth oxide; X mol. % $Al_2O_3$, wherein X is greater than or equal to about 4 mol. % and less than or equal to about 8 mol. %.; and Y mol. % alkali oxide, wherein the alkali oxide includes $Na_2O$ in an amount greater than or equal to about 9 mol. % and less than or equal to about 15 mol. %, a ratio of Y:X is greater than 1, and the glass composition is free of boron and compounds of boron.

In a particular embodiment, the ratio of Y:X is less than or equal to about 2. In a particular embodiment, the ratio of Y:X is greater than or equal to about 1.3 and less than or equal to about 2.0.

In one embodiment, the alkaline earth oxide includes MgO and CaO and has a ratio (CaO (mol. %)/(CaO (mol. %)+MgO (mol. %))) less than or equal to 0.5.

In another embodiment, the alkali oxide includes $K_2O$ in an amount greater than or equal to about 0.01 mol. % and less than or equal to about 1.0 mol. %.

In another aspect, the present invention provides a delamination resistant pharmaceutical container formed, at least in part, of a glass composition including from about 68 mol. % to about 80 mol. % $SiO_2$; from about 3 mol. % to about 13 mol. % alkaline earth oxide; X mol. % $Al_2O_3$; Y mol. % alkali oxide, wherein the alkali oxide includes $Na_2O$ in an amount greater than about 8 mol. %; and $B_2O_3$, wherein a ratio ($B_2O_3$ (mol. %)/(Y mol. %–X mol. %) is greater than 0 and less than 0.3, and a ratio of Y:X is greater than 1.

In one embodiment, the amount of $SiO_2$ is greater than or equal to about 70 mol. %.

In one embodiment, the amount of alkaline earth oxide is greater than or equal to about 4 mol. % and less than or equal to about 8 mol. %. In a particular embodiment, the alkaline earth oxide includes MgO and CaO and has a ratio (CaO (mol. %)/(CaO (mol. %)+MgO (mol. %))) less than or equal to 0.5. In a particular embodiment, the alkaline earth oxide includes CaO in an amount greater than or equal to about 0.1 mol. % and less than or equal to about 1.0 mol. %. In a particular embodiment, the alkaline earth oxide includes from about 3 mol. % to about 7 mol. % MgO.

In one embodiment, the alkali oxide is greater than or equal to about 9 mol. % $Na_2O$ and less than or equal to about 15 mol. % $Na_2O$. In a particular embodiment, the alkali oxide further includes $K_2O$ in a concentration less than or equal to about 3 mol. %. In another embodiment, the alkali oxide further includes $K_2O$ in a concentration greater than or equal to about 0.01 mol. % and less than or equal to about 1.0 mol. %.

In another embodiment, the pharmaceutical container has a ratio ($B_2O_3$ (mol. %)/(Y mol. %–X mol. %) less than 0.2. In a particular embodiment, the amount of $B_2O_3$ is less than or equal to about 4.0 mol. %. In another embodiment, the amount of $B_2O_3$ is greater than or equal to about 0.01 mol. %.

In one embodiment, X is greater than or equal to about 2 mol. % and less than or equal to about 10 mol. %. In a particular embodiment, the ratio of Y:X is less than or equal to 2. In another embodiment, the ratio of Y:X is greater than 1.3.

In one embodiment, the glass composition is free of phosphorous and compounds of phosphorous.

In one embodiment, the glass composition has a type HGB1 hydrolytic resistance according to ISO 719. Alternatively or in addition, the glass composition has a type HGA1 hydrolytic resistance according to ISO 720 after ion exchange strengthening. Alternatively or in addition, the glass composition has a type HGA1 hydrolytic resistance according to ISO 720 before and after ion exchange strengthening. Alternatively or in addition, the glass composition has at least a class S3 acid resistance according to DIN 12116. Alternatively or in addition, the glass composition has at least a class A2 base resistance according to ISO 695.

In one embodiment, the glass composition is ion exchange strengthened.

In another embodiment, the composition further includes a compressive stress layer with a depth of layer greater than or equal to 10 μm and a surface compressive stress greater than or equal to 250 MPa.

In one embodiment of any of the foregoing aspects of the invention, the pharmaceutical container further includes a pharmaceutical composition having an active pharmaceutical ingredient. In a particular embodiment, the pharmaceutical composition includes a citrate or phosphate buffer, for example, sodium citrate, SSC, monosodium phosphate or disodium phosphate. Alternatively or in addition, the pharmaceutical composition has a pH between about 7 and about 11, between about 7 and about 10, between about 7 and about 9, or between about 7 and about 8.

In a particular aspect, the present invention provides a delamination resistant pharmaceutical container formed, at least in part, of a glass composition including about 76.8 mol. % $SiO_2$; about 6.0 mol. % $Al_2O_3$; about 11.6 mol. % $Na_2O$; about 0.1 mol. % $K_2O$; about 4.8 mol. % MgO; and about 0.5 mol. % CaO, wherein the glass composition is free of boron and compounds of boron; and wherein the pharmaceutical container further comprises an active pharmaceutical composition.

These and other aspects, advantages, and salient features will become apparent from the following detailed description, the accompanying drawings, and the appended claims.

DETAILED DESCRIPTION

Figure 1:
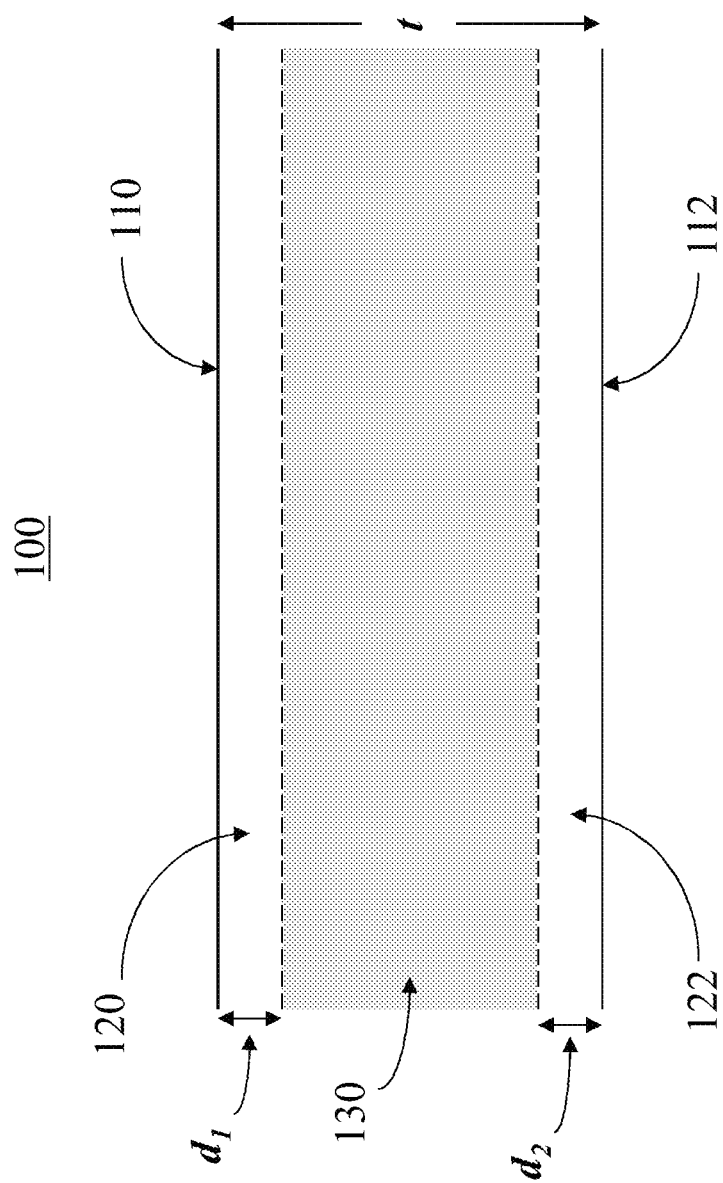
FIG. 1 is a cross-sectional schematic view of segment of a strengthened container wall.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified.

Pharmaceutical Containers

Pharmaceutical containers are used for storing, maintaining and/or delivering pharmaceutical compositions, such as liquids, solutions, powders, e.g., lyophilized powders, solids and the like. As used herein, the term "pharmaceutical container" refers to a container designed to store, maintain and/or deliver a pharmaceutical composition. The pharmaceutical containers, as described herein, are formed, at least in part, of the delamination resistant glass compositions described above. Pharmaceutical containers of the present invention include, but are not limited to, Vacutainers™, cartridges, syringes, ampoules, bottles, flasks, phials, tubes, beakers, vials, injection pens or the like. In a particular embodiment, the pharmaceutical container is a vial. In a particular embodiment, the pharmaceutical container is an ampoule. In a particular embodiment, the pharmaceutical container is an injection pen. In a particular embodiment, the pharmaceutical container is a tube. In a particular embodiment, the pharmaceutical container is a bottle. In a particular embodiment, the pharmaceutical container is a syringe. In a particular embodiment, the pharmaceutical container is a cartridge.

Moreover, the ability to chemically strengthen the glass compositions through ion exchange can be utilized to improve the mechanical durability of pharmaceutical containers formed from the glass composition. Accordingly, it should be understood that, in at least one embodiment, the glass compositions are incorporated in a pharmaceutical container in order to improve the chemical durability and/or the mechanical durability of the pharmaceutical container.

The present invention is based, at least in part, on the identification of a pharmaceutical container particularly suited for storage, maintenance and/or delivery of therapeutically efficacious pharmaceutical compositions and, in particular sterile pharmaceutical solutions comprising active pharmaceutical ingredients.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Glass is a preferred material for pharmaceutical packaging for several reasons, including optical clarity, hermeticity, and chemical inertness. However, it is possible for a glass package to exhibit a through-thickness crack which can destroy the contents' hermeticity or sterility and yet still effectively contain the drug. The primary concern for this defect is possible unawareness of the pharmaceutical recipient of the non-sterility of the active pharmaceutical ingredient which may, in some instances, lead to ineffectual medicinal dosage and adverse health consequences.

Described herein are a glass container and method to ensure self-elimination of containers, and the rendering of the contents such as, for example, a pharmaceutical, contained therein unusable, when cracking extension potentially violates the integrity of the container, thus assuring the user that the contents of the pharmaceutical container are sterile. As used herein, terms such as "container" and "vessel" refer to any article that is adapted to hold a solid or fluid for storage. The container may, in some embodiments, be sealable. The container and method rely on the release of stored elastic energy in the walls of the container. Cracks will not propagate when experiencing a net compressive stress, and only propagate when an applied tensile stress is great enough to break bonds at the flaw tip.

A container or vessel, such as a vial for holding sterile substances such as vaccines, biologics, pharmaceuticals, solutions, or the like in which super-critical crack growth through the thickness of the container wall and laterally across the container surface destroys the integrity of the container, is provided. Non-limiting examples of such containers include glass vials, bottles, cartridges, syringes, ampules, or the like. The container comprises a glass. The container has at least one wall having a thickness t, a first surface, and a second surface. The at least one wall is strengthened, and the first and second surfaces are each under a compressive stress CS. The regions under compressive stress, also referred to herein as the "compressive layers," extend from the first and second surfaces, respectively, to a depth of layer DOL within the container wall. The compressive stress in the compressive layers is balanced by tensile stress, also referred to herein as "central tension" or "CT," in a central region of the wall. The central tension CT is greater than a threshold tensile stress at which crack front propagation and subsequent bifurcation or splitting—also referred to herein as "multiple crack branching"—in the glass occurs and the central tension alone (i.e., absent external stresses) is sufficient to assure destruction of the glass and the container into multiple pieces. Under such conditions, multiple crack propagation and branching occurs within a relatively short time (typically less than 24 hours), as opposed to other mechanisms, such as fatigue or the like, which may result in container failure over the span of days. In some embodiments, destruction of the container due to the above mechanism occurs in less than about one hour. In some embodiments, the threshold tensile stress is sufficient to allow self-propagation of a crack and/or multiple cracks branching through the entire thickness of the glass from the first surface to the second surface of the container. Such crack splitting ensures that a breach of the integrity of the container does not go unnoticed and elimination of such "closed container integrity" (CCI) violations. While the above descriptions describe a delay between the "insult" and the "failure event," it should be understood that at no time during this delay is the sterility compromised prior to the failure event; i.e., at no point is a through-crack stable prior to container failure.

The introduction of compressive stress into a glass container or vessel surface will increase mechanical performance of the final product. If the stored energy is great enough, flaws penetrating deeper than the compressive layer and into the tensile layer will spontaneously propagate both through the wall thickness and laterally across the wall, leading to complete failure and destruction of the contents of the container or vessel.

A cross-sectional schematic view of a segment of the strengthened pharmaceutical container wall is shown in FIG. 1. The pharmaceutical container can be any one of a typical such container, such as a vial, syringe, cartridge or ampule. The pharmaceutical container wall 100 comprising at least one glass has a thickness t, first surface 110, and second surface 112. Pharmaceutical container wall 100 has a nominal thickness t of up to about 6 mm. In some embodiments, thickness t is in a range from 0.05 mm up to about 4 mm, in other embodiments, in a range from about 0.3 mm to about 2 mm, and in still other embodiments, in a range from about 0.9 mm to about 1.5 mm. It is understood that complex pharmaceutical packaging geometries such as vials, cartridges and the like may have a variety of wall thicknesses throughout the container. While the embodiment shown in FIG. 1 depicts pharmaceutical container wall 100 as a flat planar sheet, pharmaceutical container wall 100 may have other configurations, such as three dimensional shapes or non-planar configurations. Pharmaceutical container wall 100 has a first compressive layer 120 extending from first surface 110 to a depth of layer $d_1$ into the bulk of the pharmaceutical container wall 100. In the embodiment shown in FIG. 1, pharmaceutical container wall 100 also has a second compressive layer 122 extending from second surface 112 to a second depth of layer $d_2$. Depths of layer $d_1$, $d_2$ also refer to the depth at which the stress changes from negative (compression) to positive (tension). Pharmaceutical container wall 100 also has a central region 130 that extends from $d_1$ to $d_2$. Central region 130 is under a tensile stress or central tension (CT), which balances or counteracts the compressive stresses of first and second compressive layers 120 and 122. The depth $d_1$, $d_2$ of first and second compressive layers 120, 122 protects the pharmaceutical container wall 100 from the propagation of flaws introduced by sharp impact to first and second surfaces 110, 112 of pharmaceutical container wall 100, while the compressive stress minimizes the likelihood of a flaw penetrating through the depth $d_1$, $d_2$ of first and second compressive layers 120, 122. In some embodiments, the compressive stress CS in each of first region 120 and second region 122 is at least about 200 MPa and, in other embodiments, at least about 500 MPa. In some embodiments, each of the depths of layer $d_1$, $d_2$ is at least about 30 μm and, in some embodiments, at least about 50 μm. In other embodiments, the depths of layer $d_1$, $d_2$ are between 15 and 25% of the wall thickness t. The relationship between CS and central tension CT is given by the expression:

$$CT=(CS \cdot DOL)/(t-2DOL). \quad (1)$$

Unless otherwise specified, central tension CT and compressive stress CS are expressed herein in megaPascals (MPa), whereas thickness t and depth of layer DOL are expressed in millimeters. The depth of the compression layer DOL and the maximum value of compressive stress CS that can be designed into or provided to a glass article are limited by frangible behavior; i.e., forceful or energetic fragmentation of the glass upon fracture.

Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

The glass of the pharmaceutical container wall 100 is strengthened by the introduction of a compressive stress. These compressive stresses must first be overcome before encapsulated flaws in the glass will experience enough tension to propagate. Such compressive stress may be introduced, for example, by thermal tempering, chemical tempering by ion exchange, lamination of glasses or glasses and plastics (e.g., glass/glass or glass/plastic/glass lamination) having different moduli and/or coefficients of thermal expansion (CTE), and/or coatings of materials having moduli and/or CTE that differ from those of the glass. In some embodiments, the glass (or glasses) forming outer regions 120, 122 of glass container 100 has a CTE that is less than that of the glass (or glasses) forming the central region of container 100. Similarly, the glass (or glasses) forming outer regions 120, 122 of glass container 100, in some embodiments, has a Young's modulus that is greater than that of the glass (or glasses) forming the central region of container 100. In some embodiments, the coating is a high-modulus coating comprising at least one inorganic material such as, but not limited to, alumina ($Al_2O_3$), silica ($SiO_2$), combinations thereof, or the like.

One consequence of the introduction of compressive stress is the complementary buildup of tensile stress in opposing regions of the container. For physical force balance to be maintained, the amount of stored elastic energy (SEE) in both compressive (e.g., 120, 122 in FIG. 1) and tensile (e.g., 130 in FIG. 1) regions (compression and tension) must be equal. In most cases, the glass surface experiences a large compressive stress, and the interior experiences a smaller magnitude tensile stress. Accordingly, the large compressive stress at the surface is focused over a shallow depth, while the smaller tensile stress is distributed over the entire container wall thickness.

The stored compressive stress of both compressive regions (120, 122 in FIG. 1) is balanced by stored tension in the central region (130) of the glass, the allowable upper limit of which is set by the frangibility limit for a given glass thickness. The frangibility limit and frangibility are described in U.S. Provisional Patent Application No. 61/657,279, filed on Jun. 8, 2012, by Kristen L. Barefoot et al., entitled "Strengthened Glass Articles and Method of Making," the contents of which are incorporated herein by reference in their entirety. As described in the above-referenced application, frangibility or frangible behavior is characterized by at least one of: breaking of the strengthened glass article (e.g., a plate or sheet) into multiple small pieces (e.g., ≤1 mm); the number of fragments formed per unit area of the glass article; multiple crack branching from an initial crack in the glass article; and violent ejection of at least one fragment a specified distance (e.g., about 5 cm, or about 2 inches) from its original location; and combinations of any of the foregoing breaking (size and density), cracking, and ejecting behaviors. The terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glasses described herein, such external restraints are not used in determining the frangibility or frangible behavior of the glass articles. The $CT_{limit}$ for strengthened glass in which the compressive stress profile is characterized by a single complementary error function for a given thickness t of glass can be determined by the equation $$CT_{limit} \text{ (MPa)} = 9.0 \text{ (MPa/mm)} \cdot \ln(t) \text{ (mm)} + 49.3 \text{ (MPa/mm)} \cdot \ln^2(t) \text{ (mm)}, \tag{2}$$

where the $CT_{limit}$ is in units of MPa, glass thickness t is in units of mm and less than or equal to about 1 mm, and ln(t) is the natural logarithm (base e) of the thickness t. The integrated central tension (ICT), which is the tensile stress integrated over the entire region under tension (i.e., from $d_1$ to $d_2$ in FIG. 1) may also be used to characterize fragmentation behavior.

Alternatively, the stored elastic energy density (SEE) within tensile region of the glass may be used to define fragmentation behavior. The stored elastic energy is given by the equation $$SEE = (CT^2/E) \cdot (t - 2DOL) \cdot (1 - \nu), \tag{3}$$

where E is Young's modulus, t is the thickness of the container wall, $\nu$ is the Poisson's ratio of the material, and the depth of layer DOL is the depth at which the stress changes from positive (compression) to negative (tension).

Figure 2:
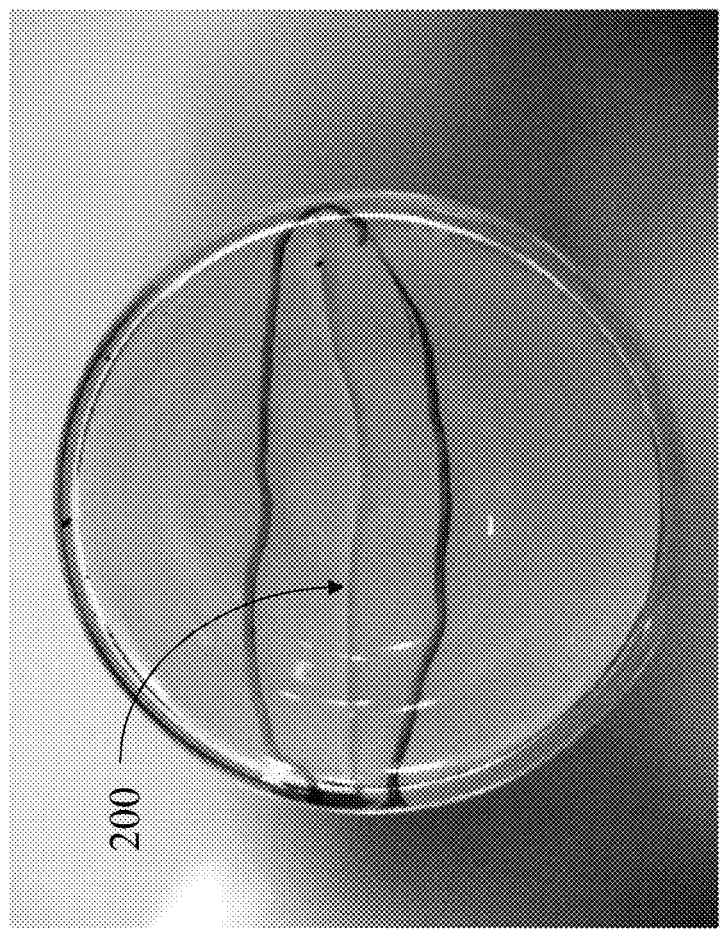
FIG. 2 is a photograph of a glass container that has experienced a through-thickness crack without catastrophic failure.

Flaws propagate under applied tensile stresses, and energy is consumed in the creation of new surface area generated by the flaw or crack. In unstrengthened glasses, energy may be dispersed in flaw propagation—including through-thickness propagation—but the crack growth will stop upon removal or consumption of the applied stress. This is the mechanism for creation of the flaw shown in FIG. 2. The glass package in FIG. 2 experienced a through-thickness crack 200 without catastrophic failure. The package contents are considered non-sterile and unfit for use due to the presence of crack 200.

Figure 3:
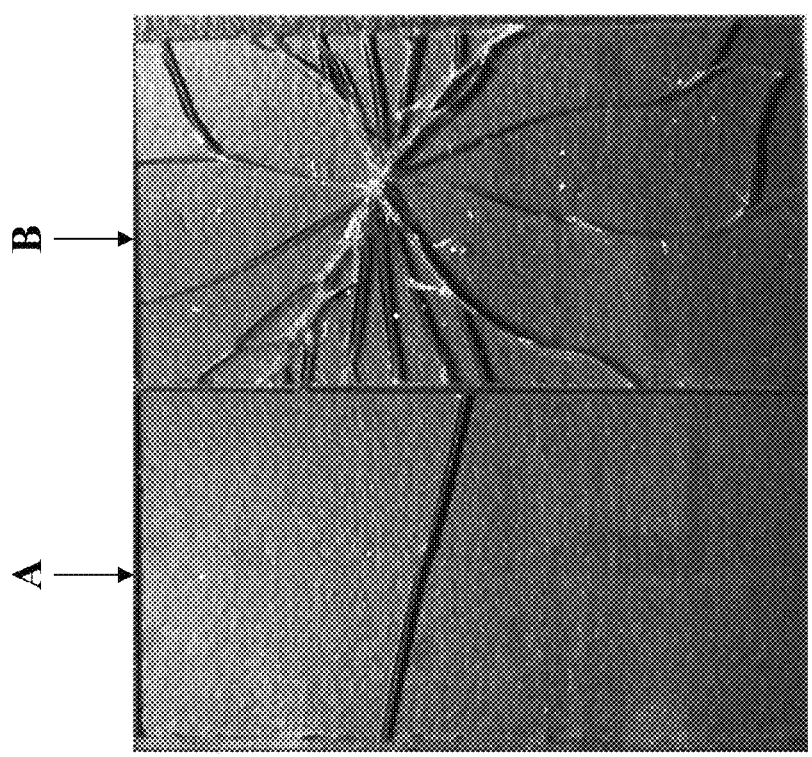
FIG. 3 is a photograph of crack propagation behavior in under-stressed and critically-stressed or frangible glasses.

In the case of strengthened glass, it is possible to engineer the stored elastic energy or corresponding central tension to be great enough so that crack fronts which extend into the tensile region will self-propagate to cause complete separation of glass and catastrophic failure of the container. This is often characterized by crack front bifurcation/crack-front splitting, where the central tension alone—absent external stresses—is sufficient to ensure destruction of the glass package into multiple pieces. Photographs of crack propagation behavior in under-stressed (A) and critically-stressed or frangible (B) glasses are shown in FIG. 3. In critically-stressed glass (B), any crack induced deeper than the depth-of-layer (into the central tension region) will propagate catastrophically, whereas only a single crack propagates in the under-stressed glass (A). In the typical non-stressed case (A), if the single crack is hidden, for example, by a label, a patient or administering professional may be unaware of the loss of sterility. In the typical strengthened and critically-stressed/frangible case (B) where when a severe flaw is initiated, complete destruction of the container is assured.

Figure 4:
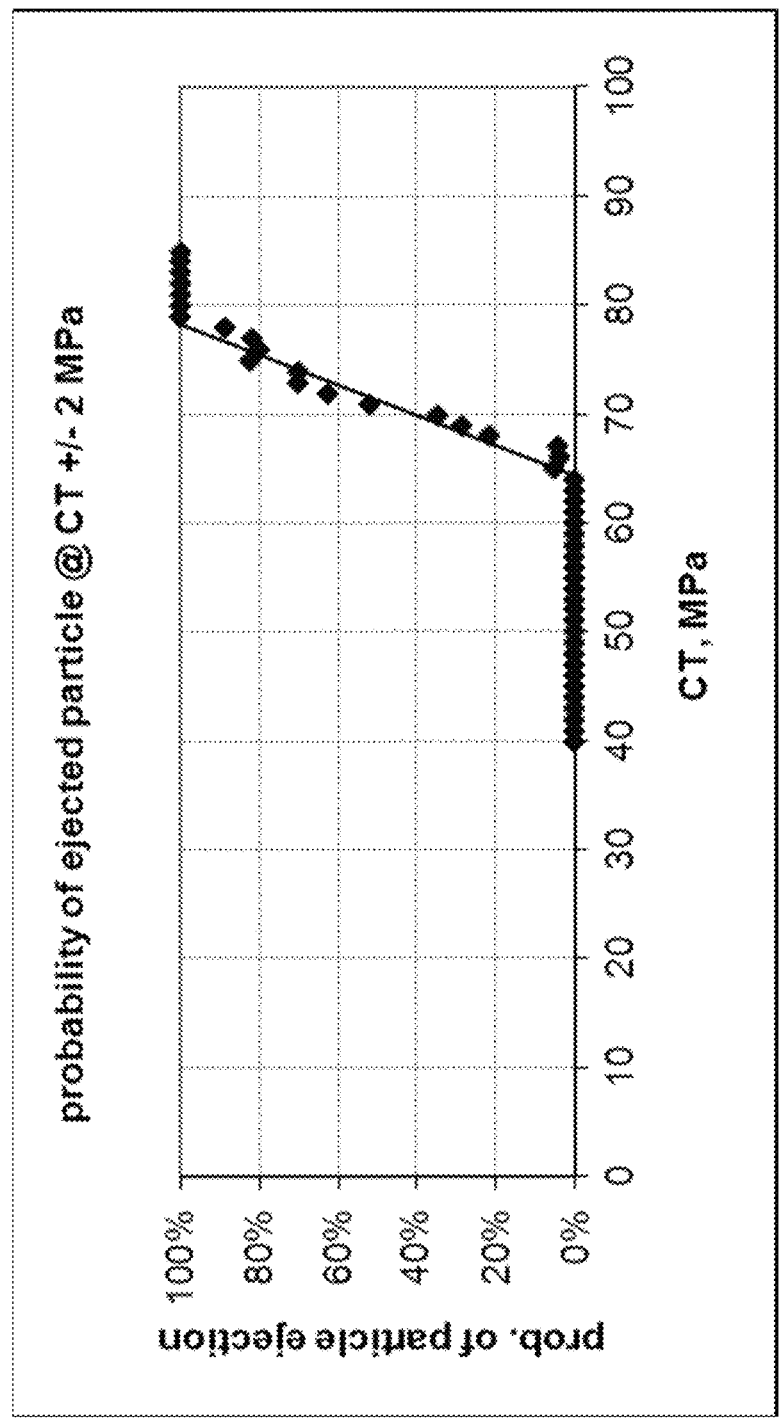
FIG. 4 is a plot of the dependence of critical/catastrophic crack growth in ion exchanged glass as a function of central tension.

The transition in behavior from sub-critical crack growth to super-critical crack growth with increasing central tension is shown in FIG. 4, which is a plot of the probability of particle ejection as a function of central tension CT of the glass. FIG. 4 illustrates the dependence of critical/catastrophic crack growth in ion exchanged glass as a function of central tension (CT). As the elastic energy stored as CT increases above a threshold value (e.g., $CT_{limit}$ in equation (2)), cracks will propagate unassisted to release the stored energy. The threshold central tension $CT_{limit}$ may be calculated using the Inglis criteria, which relates crack size to fracture toughness $K_{1C}$, which is given by the equation $$K_{1C} = Y \cdot \sigma \cdot (\pi \cdot c)^{1/2}, \tag{4}$$

where Y is a geometric factor for crack shape, $\sigma$ is the stress applied to the crack to allow crack propagation, and C is the crack length. For glass, $K_{1C}$ is about 0.7±0.05. The geometric factor Y is about 1.12 for round (half penny) cracks. Crack length c is assumed to be about one half the thickness of the wall of the glass container. For a container wall having a thickness of 1.1 mm, $CT_{limit}$ is calculated to be about 15 Mpa using equation (4).

In some embodiments, the threshold central tension $CT_{limit}$ is at least about 15 MPa, which is sufficient to cause a single crack to propagate without lateral branching. In those embodiments in which lateral branching of cracks occurs, the central tension is at least about 30 MPa and, in some embodiments, at least about 45 MPa, with the actual value depending upon the thickness of the container wall. For example, for wall thicknesses in a range from about 1 mm to about 1.2 mm, the central tension must be at least about 20 MPa for cracks (which may not be perfectly aligned with the stress field) to linearly self-propagate, and about 50 MPa in order for cracks to self-propagate with lateral branching.

For glass containers having a wall thickness in a range from about 0.5 mm to about 1.5 mm, the stored elastic energy SEE, in some embodiments, should be at least about 3.0 MPa·μm (i.e., $(CT^2/E) \cdot (t-2DOL) \cdot (1-v) \geq 3.0$ MPa·μm) in order for cracks to self-propagate laterally through the container wall. In other embodiments, SEE is at least about 9.5 MPa·μm (i.e., $(CT^2/E) \cdot (t-2DOL) \cdot (1-v) \geq 9.5$ MPa·μm) to laterally self-propagate with minimal delay between insult and separation. In other embodiments, SEE is at least 15.0 MPa·μm (i.e., $(CT^2/E) \cdot (t-2DOL) \cdot (1-v) \geq 15.0$ MPa·μm) to laterally self-propagate cracks with branching through the container wall. Table 1 lists three different levels of crack propagation and the respective central tension, integrated central tension and sored elastic energy associated with each type of behavior.

TABLE 1

Levels of crack propagation and central tension, integrated central tension, and stored elastic energy associated with each level.

| Level | | CT (MPa) | ICT (MPa · μm) | SEE (MPa · μm) |
|---|---|---|---|---|
| 1 | Crack propagation, some delayed | 15 | 15000 | 3.0 |
| 2 | Crack propagation, no delay or short delay | 30 | 30000 | 9.5 |
| 3 | Crack propagation, bifurcation | 45 | 42000 | 15.0 |

Figure 5:
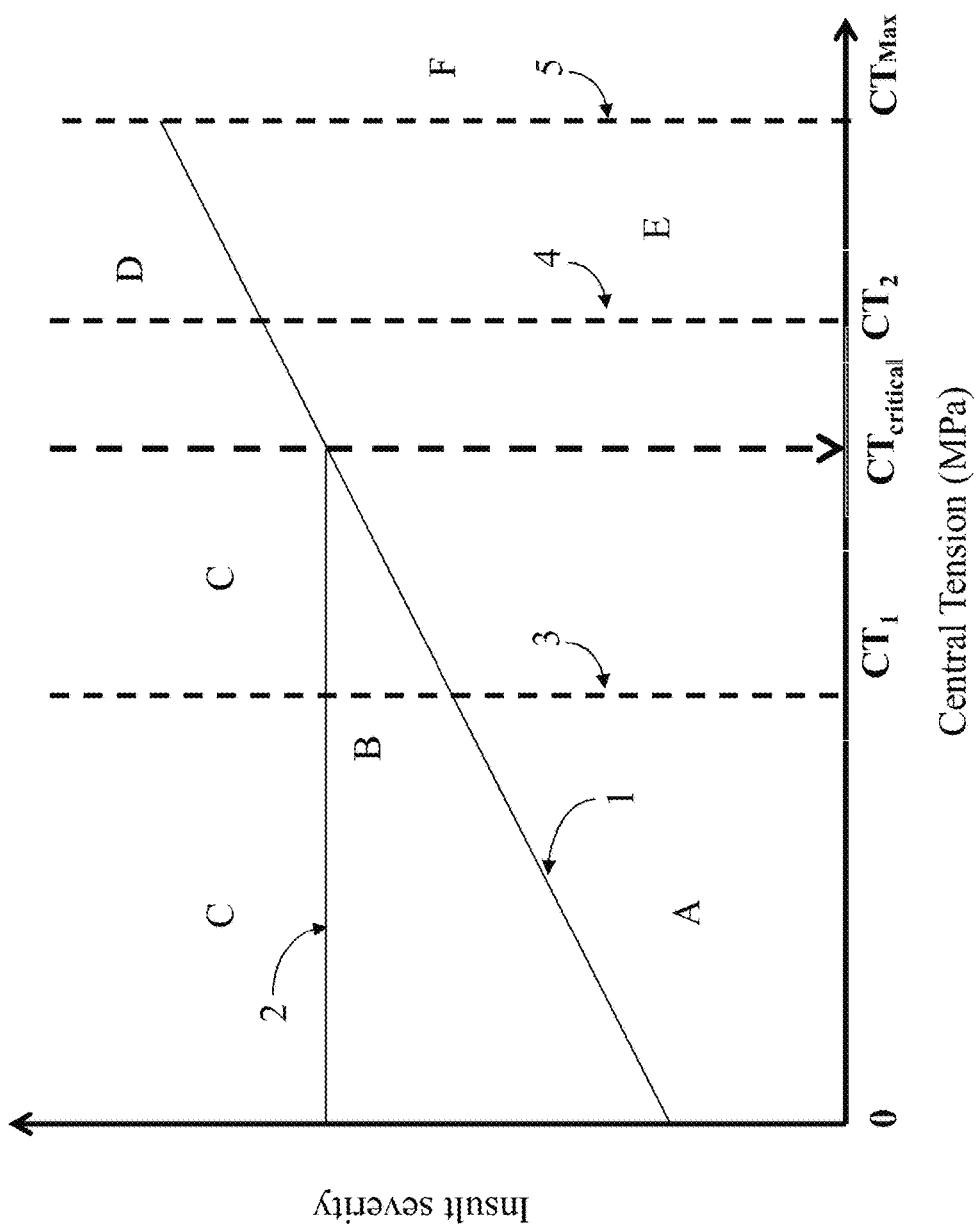
FIG. 5 is a schematic plot of insult force versus central tension showing possible breakage modes.

Types of damage incurred by glass containers depend in part upon the central tension CT within the glass and the amount of insult force applied to the glass. Possible breakage modes are shown in a schematic plot of insult force versus central tension in FIG. 5. FIG. 5 is meant to illustrate broad, qualitative behavior trends and is not intended to show well-defined force boundaries between the observed fracture states. In fact, the boundaries are quite diffuse and substantial overlap between regions is known to occur. In general, the types of damage observed may be placed in one of three categories. First, a flaw may be introduced, but the depth of the flaw is less than the thickness of the container wall (region A in FIG. 5). This may result in some surface abrasion or "scuffing" of the surface of the container wall, and occurs at lower insult forces ("insult severity" in FIG. 5) and in instances where the central tension is below a critical value $CT_{critical}$. With increasing insult force, flaws having depths that are greater than the wall thickness are introduced into the glass container (region B in FIG. 5), resulting in through-cracks and breach of container integrity, but not necessarily breakage. As CT increases, greater force must be applied to the container wall to introduce flaws that will result in through-cracks. This is represented by the boundary between the behaviors described in regions A and B, which is approximated by line 1 in FIG. 5. At higher insult forces (approximated by line 2 in FIG. 5), the glass container separates or breaks into multiple pieces (region C in FIG. 5). Beyond a maximum central tension $CT_{Max}$ (line 5 in FIG. 5) insult results in frangible behavior of (i.e., explosive or energetic breakage and ejection of fragments) of the glass (region F in FIG. 5).

Beyond $CT_{critical}$, through-cracks generally do not occur and damage is characterized by either breakage/separation of the container (region D in FIG. 5) or by the introduction of flaws that do not penetrate the thickness of the container wall (region E in FIG. 5), with the boundary between the two damage regimes approximated by line 1.

Figure 9:
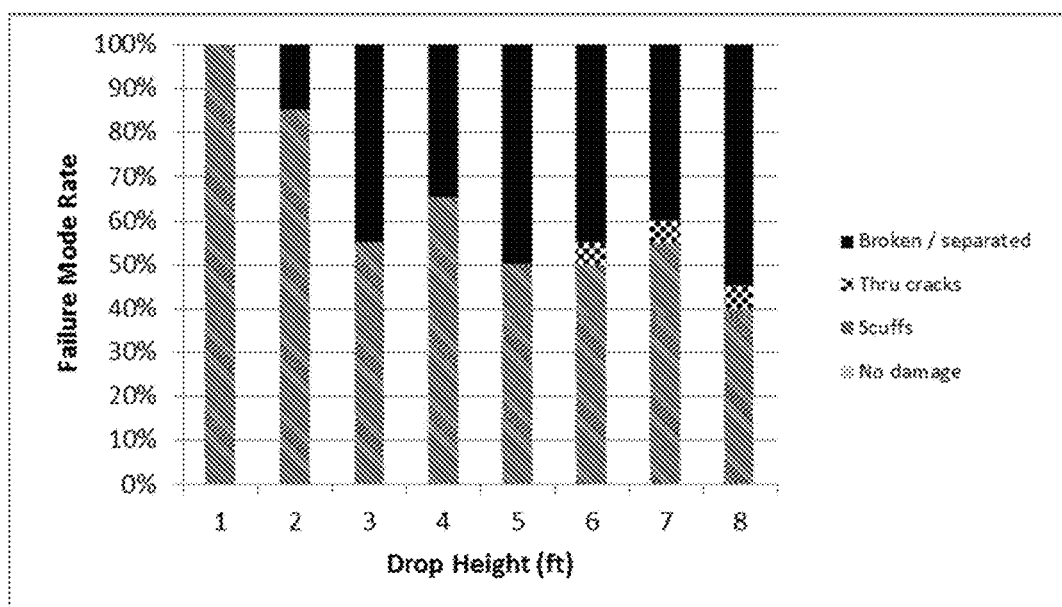
FIG. 9 is a plot of failure rate as a function of drop height.

The failure mode rate of non-ion exchanged borosilicate glass vials is plotted as a function of insult level—expressed here as drop height—in FIG. 9. As the level of insult increases, the rate of failure increases.

Borosilicate glasses (ASTM E438-92 (Standard Specification for Glasses in Laboratory Apparatus) Type 1, class A glasses—3.3 ppm/K, Type 1, class B glasses—5.1 ppm/K) that are typically used as containers for pharmaceuticals, serum, vaccines, and the like may only be strengthened to achieve a central tension $CT_1$ (line 3 in FIG. 5) that is below $CT_{critical}$ when ion exchanged for periods that are typically used. To obtain a central tension $CT_1$ that is greater than $CT_{critical}$, such glasses must be ion exchanged for at least 100 hours, which is regarded as unpractical. Such glasses are thus subject to the damage regime in which flaws may result in through-cracks, but no breakage (region B), even though this behavior may be at a low (<10%) frequency. Consequently, a breach of the container wall and compromise of the container's contents may not be detected. In contrast, the glasses described herein may be strengthened to achieve a central tension $CT_2$ (line 4 in FIG. 5) that is greater than $CT_{critical}$, and will thus be subject to damage regimes in which the container is either not compromised (the flaw depth is less than the thickness of the container) or breaks.

In some embodiments, the container comprises at least one aluminosilicate glass. In particular embodiments, the aluminosilicate glass comprises at least one alkali metal oxide. In some embodiments the container comprises a glass composition that is within the ASTM standard type 1b glass compositions.

In some embodiments, the glass container comprises a chemically durable glass such as that described in U.S. patent application Ser. No. 13/660,141, filed Oct. 25, 2012, by Melinda Drake et al., entitled "Alkaline Earth Aluminosilicate Glass Compositions with Improved Chemical and Mechanical Durability," which claims priority from U.S. Provisional Patent Application No. 61/551,133, filed Oct. 25, 2011, and having the same title. The contents of both applications are incorporated herein by reference in their entirety. This exemplary glass composition generally includes $SiO_2$, $Al_2O_3$, at least one alkaline earth oxide, and alkali oxides including at least $Na_2O$ and $K_2O$. In some embodiments, the glass compositions may also be free from boron and compounds containing boron. The combination of these components enables a glass composition which is resistant to chemical degradation and is also suitable for chemical strengthening by ion exchange. In some embodiments, the glass compositions may further comprise minor amounts of one or more additional oxides such as, for example, $SnO_2$, $ZrO_2$, ZnO, or the like, which may be added as fining agents and/or to further enhance the chemical durability of the glass composition. In some embodiments, the glasses described therein include from about 67 mol % to about 75 mol % $SiO_2$; from about 6 mol % to about 10 mol % $Al_2O_3$; from about 5 mol % to about 12 mol % alkali oxide; and from about 9 mol % to about 15 mol % of alkaline earth oxide. The alkali oxide comprises at least $Na_2O$ and $K_2O$. In other embodiments, the glasses described therein comprise from about 67 mol % to about 75 mol % $SiO_2$; from about 6 mol % to about 10 mol % $Al_2O_3$; from about 5 mol % to about 12 mol % alkali oxide; and from about 9 mol % to about 15 mol % of alkaline earth oxide. The alkaline earth oxide comprises at least one of SrO and BaO.

In some embodiments, the glass container comprises a chemically durable glass such as that described in described in U.S. patent application Ser. No. 13/660,450, filed Oct. 25, 2012, by Paul S. Danielson et al., entitled "Glass Compositions with Improved Chemical and Mechanical Durability," which claims priority from U.S. Provisional Patent Application No. 61/551,163, filed Oct. 25, 2011, and having the same title. The contents of both applications are incorporated herein by reference in their entirety. The alkali aluminosilicate glass generally includes $SiO_2$, $Al_2O_3$, at least one alkaline earth oxide, and one or more alkali oxides, such as $Na_2O$ and/or $K_2O$, and is free from boron and compounds containing boron. The alkali aluminosilicate glass composition may also be free from phosphorous and compounds containing phosphorous. The combination of these components enables a glass composition which is resistant to chemical degradation and is also suitable for chemical strengthening by ion exchange. In some embodiments the glass compositions may further comprise minor amounts of one or more additional oxides such as, for example, $SnO_2$, $ZrO_2$, ZnO, $TiO_2$, $As_2O_3$ or the like, which may be added as fining agents and/or to further enhance the chemical durability of the glass composition. In some embodiments, such glasses may include from about 67 mol % to about 78 mol % $SiO_2$; from about 3 mol % to about 13 mol % alkaline earth oxide; X mol % $Al_2O_3$; and Y mol % alkali oxide. The alkali oxide comprises $Na_2O$ in an amount greater than 8 mol % and a ratio of Y:X which is greater than 1. In other embodiments, such glasses may comprise from about 67 mol % to about 78 mol % $SiO_2$; from about 3 mol % to about 13 mol % alkaline earth oxide, wherein the alkaline earth oxide comprises CaO in an amount greater than or equal to 0.1 mol % and less than or equal to 1.0 mol %; X mol % $Al_2O_3$, wherein X is greater than or equal to 2 mol % and less than or equal to about 10 mol %; Y mol % alkali oxide, wherein a ratio of Y:X is greater than 1. The glass compositions described in U.S. Provisional Patent Applications No. 61/551,163 and 61/551,133 are free from boron and compounds of boron and ion exchangeable, thereby facilitating chemically strengthening the glass to improve mechanical durability.

In other embodiments, the alkali aluminosilicate glass comprises: from about 64 mol % to about 68 mol % $SiO_2$; from about 12 mol % to about 16 mol % $Na_2O$; from about 8 mol % to about 12 mol % $Al_2O_3$; from 0 mol % to about 3 mol % $B_2O_3$; from about 2 mol % to about 5 mol % $K_2O$; from about 4 mol % to about 6 mol % MgO; and from 0 mol % to about 5 mol % CaO; wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)−$Al_2O_3$≥2 mol %; 2 mol %≤$Na_2O$−$Al_2O_3$≤6 mol %; and 4 mol % ($Na_2O$+$K_2O$)−$Al_2O_3$≤10 mol %. The glass is described in U.S. Pat. No. 7,666,511 by Adam J. Ellison et al., entitled "Down-Drawable, Chemically Strengthened Glass for Cover Plate," filed Jul. 27, 2007, and claiming priority to U.S. Provisional Patent Application No. 60/930,808, filed on May 18, 2007, the contents of which are incorporated herein by reference in their entirety.

In other embodiments, the alkali aluminosilicate glass comprises: at least one of alumina and boron oxide, and at least one of an alkali metal oxide and an alkali earth metal oxide, wherein −15 mol % ($R_2O$+R'O−$Al_2O_3$−$ZrO_2$)−$B_2O_3$≤4 mol %, where R is one of Li, Na, K, Rb, and Cs, and R' is one of Mg, Ca, Sr, and Ba. In some embodiments, the alkali aluminosilicate glass comprises: from about 62 mol % to about 70 mol. % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. The glass is described in U.S. Pat. No. 8,158,543 by Matthew J. Dejneka et al., entitled "Glasses Having Improved Toughness and Scratch Resistance," filed Nov. 25, 2008, and claiming priority to U.S. Provisional Patent Application No. 61/004,677, filed on Nov. 29, 2008, the contents of which are incorporated herein by reference in their entirety.

In other embodiments, the alkali aluminosilicate glass comprises: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %. The glass is described in U.S. patent application Ser. No. 12/392,577 by Sinue Gomez et al., entitled "Fining Agents for Silicate Glasses," filed Feb. 25, 2009, and claiming priority to U.S. Provisional Patent Application No. 61/067,130, filed on Feb. 26, 2008, the contents of which are incorporated herein by reference in their entirety.

In other embodiments, the alkali aluminosilicate glass comprises $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises: from about 61 mol % to about 75 mol % $SiO_2$; from about 7 mol % to about 15 mol % $Al_2O_3$; from 0 mol % to about 12 mol % $B_2O_3$; from 9 mol % to about 21 mol % $Na_2O$; from 0 mol % to about 4 mol % $K_2O$; from 0 mol % to about 7 mol % MgO; and 0 mol % to about 3 mol % CaO. The glass is described in U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009, the contents of which are incorporated herein by reference in their entirety.

In other embodiments, the alkali aluminosilicate glass comprises at least 50 mol % $SiO_2$ and at least one modifier selected from the group consisting of alkali metal oxides and alkaline earth metal oxides, wherein [($Al_2O_3$ (mol %)+$B_2O_3$ (mol %))/(Σalkali metal modifiers (mol %))]>1. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. The glass is described in U.S. patent application Ser. No. 12/858,490 by Kristen L. Barefoot et al., entitled "Crack And Scratch Resistant Glass and Enclosures Made Therefrom," filed Aug. 18, 2010, and claiming priority to U.S. Provisional Patent Application No. 61/235,767, filed on Aug. 21, 2009, the contents of which are incorporated herein by reference in their entirety.

In other embodiments, the alkali aluminosilicate glass comprises $SiO_2$, $Al_2O_3$, $P_2O_5$, and at least one alkali metal oxide ($R_2O$), wherein $0.75 \leq [(P_2O_5 \text{ (mol \%)} + R_2O \text{ (mol \%)})/M_2O_3 \text{ (mol \%)}] \leq 1.2$, where $M_2O_3 = Al_2O_3 + B_2O_3$. In some embodiments, the alkali aluminosilicate glass comprises: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12% $P_2O_5$; and from about 12 mol % to about 16 mol % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010, the contents of which are incorporated herein by reference in their entirety.

In still other embodiments, the alkali aluminosilicate glass comprises at least about 4 mol % $P_2O_5$, wherein $(M_2O_3 \text{ (mol \%)}/R_xO \text{ (mol \%)}) < 1$, wherein $M_2O_3 = Al_2O_3 + B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$. The glass is described in U.S. patent application Ser. No. 13/678,013, filed Nov. 15, 2012, by Timothy M. Gross, entitled "Ion Exchangeable Glass with High Crack Initiation Threshold," and claiming priority to U.S. Provisional Patent Application No. 61/560,434, filed Nov. 16, 2011, the contents of which are incorporated herein by reference in their entirety.

In still other embodiments, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340 + 27.1 \cdot Al_2O_3 - 28.7 \cdot B_2O_3 + 15.6 \cdot Na_2O - 61.4 \cdot K_2O + 8.1 \cdot (MgO + ZnO) \geq 0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. patent application Ser. No. 13/533,296, by Matthew J. Dejneka et al., entitled "Ion Exchangeable Glass with High Compressive Stress," filed Jun. 26, 2012, and claiming priority from U.S. Provisional Patent Ion Application No. 61/503,734, filed Jul. 1, 2011, the contents of which are incorporated herein by reference in their entirety.

In other embodiments, the alkali aluminosilicate glasses described hereinabove are ion exchangeable and comprise at least about 50 mol % $SiO_2$; at least about 10 mol % $R_2O$, wherein $R_2O$ comprises. $Na_2O$; $Al_2O_3$, wherein $Al_2O_3$ (mol %) < $R_2O$ (mol %); and $B_2O_3$, and wherein $B_2O_3$ (mol %) − ($R_2O$ (mol %) − $Al_2O_3$ (mol %)) ≥ 3 mol %. In some embodiments, the glass comprises: at least about 50 mol % $SiO_2$, from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein $0 \leq MgO \leq 6$ and $0 \leq ZnO \leq 6$ mol %; and, optionally, at least one of CaO, BaO, and SrO, wherein $0$ mol % ≤ CaO+SrO+BaO ≤ 2 mol %. These glasses are described in U.S. Provisional Patent Application No. 61/653,489, filed May 31, 2012, by Matthew J. Dejneka et al., and entitled "Zircon Compatible, Ion Exchangeable Glass with High Damage Resistance," the contents of which are incorporated herein by reference in their entirety.

In other embodiments, the alkali aluminosilicate glasses described hereinabove are ion exchangeable and comprise: at least about 50 mol % $SiO_2$; at least about 10 mol % $R_2O$, wherein $R_2O$ comprises $Na_2O$; $Al_2O_3$, wherein $-0.5$ mol % ≤ $Al_2O_3$ (mol %) − $R_2O$ (mol %) ≤ 2 mol %; and $B_2O_3$, wherein $B_2O_3$ (mol %) − ($R_2O$ (mol %) − $Al_2O_3$ (mol %)) ≤ 4.5 mol %. In some embodiments, the glasses comprise: at least about 50 mol % $SiO_2$, from about 12 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; at least about 0.1 mol % MgO, ZnO, or combinations thereof, wherein $0$ mol % ≤ MgO ≤ 6 and $0 \leq ZnO \leq 6$ mol %; and, optionally, at least one of CaO, BaO, and SrO, wherein $0$ mol % ≤ CaO+SrO+BaO ≤ 2 mol %. These glasses are described in U.S. Provisional Patent Application No. 61/653,485, filed May 31, 2012, by Matthew J. Dejneka et al., and entitled "Ion Exchangeable Glass with High Damage Resistance," the contents of which are incorporated herein by reference in their entirety.

In some embodiments, the alkali aluminosilicate glasses described hereinabove are substantially free of (i.e., contain 0 mol % of) of at least one of lithium, boron, barium, strontium, bismuth, antimony, and arsenic.

In some embodiments, the alkali aluminosilicate glasses described hereinabove are down-drawable by processes known in the art, such as slot-drawing, fusion drawing, re-drawing, and the like, and has a liquidus viscosity of at least 130 kilopoise. In some embodiments, the alkali aluminosilicate glasses described hereinabove are suitable for tube drawing and re-forming from tubes and the like and have a liquidus viscosity of at least 10 kpoise and, in some embodiments, at least about 40 kpoise.

In another aspect, a method of making the glass article and container described hereinabove is provided. A glass having a first surface and a second surface separated by a thickness is first provided. The glass may comprise those compositions previously described herein, and be formed by those methods known in the art such as, but not limited to, down-drawing, including slot and/or fusion drawing, float methods, casting methods, molding processes such as, but not limited to, Vello, Danner, and blow-molding processes, or the like. A first region under compressive stress (compressive layer) extending from at least one surface of the glass to a depth of layer into the glass is formed using those means previously described herein, such as thermal tempering, chemical strengthening by ion exchange, lamination, or application of coatings to the surface of the glass. The formation of the regions under compressive stress in turn forms a second region in the glass that is under a tensile stress (central tension) as previously described herein. The central tension is sufficient to cause the self propagation of a crack from the first surface through the thickness of the glass article to the second surface and laterally across at the first surface and, in some embodiments, the second surface of the glass. In some embodiments, the central tension is greater than a threshold value of at least about 15 MPa. In other embodiments, the central tension is sufficient to cause lateral crack branching and/or is greater than a threshold value of at least about 30 MPa, in some embodiments, at least 35 MPa, and in still other embodiments, at least 50 MPa. For glass containers having a wall thickness in a range from about 0.5 mm to about 1.5 mm, the stored elastic energy SEE associated with the central tension, in some embodiments, is at least about 3.0 MPa·µm in order for cracks to self-propagate with lateral branching through the container wall. In other embodiments, SEE is at least about 9.5 MPa·µm, and, in still other embodiments, SEE is at least about 15.0 MPa·µm. The self propagation of the crack renders the glass article unsuitable for its intended use. Such intended uses include, but are not limited to, containers for substances, such as pharmaceuticals or the like, for which hermeticity and/or sterility are desired.

In another aspect, a method of ensuring self-elimination of a vessel having an intended use is provided. The method comprises providing the vessel, wherein the vessel comprises at least one glass and has a thickness and first surface and a second surface. As previously described hereinabove, the glass has a first region under a compressive stress, the first region extending from at least one of the first surface and the second surface to a depth of layer in the glass, and a second region under a tensile stress, the second region extending from the depth of layer. The central tension is greater than a threshold tensile stress that is sufficient to allow self-propagation of a crack front through the thickness from the first surface to the second surface and lateral cracking across the first surface and, in some embodiments, across the second surface. In some embodiments, the central tension is greater than a threshold value of at least about 15 MPa. In other embodiments, the central tension is sufficient to cause lateral crack branching and/or is greater than a threshold value of at least about 30 MPa, in some embodiments, at least 35 MPa, and in still other embodiments, at least 50 MPa. For glass containers having a wall thickness in a range from about 0.5 mm to about 1.5 mm, the stored elastic energy SEE associated with the central tension, in some embodiments, is at least about 11 J/m$^2$ in order for cracks to self-propagate with lateral branching through the container wall. In other embodiments, SEE is at least about 13 J/m$^2$. The self-propagation of the crack front laterally across the first surface, including bifurcation, renders the vessel unsuitable for its intended use.

As used herein, the terms "self-elimination," "failure," "unsuitable for (its) intended use," and the like mean that, after receiving an insult (e.g., impact), the contents of the container is exposed to the elements outside the container. Whether such exposure occurs is determined by those means known in the art, such as, for example, dye ingress testing. In dye ingress testing, the container to be tested is partially filled with clean, colorless water, and the container is closed and sealed as it would be in a commercial setting (e.g., with a rubber stopper, septa, crimp caps, etc.). the filled and sealed container is then submerged in a concentrated dye solution. Non-limiting examples of the dye include methylene blue, FD&C dyes, or the like. The dye solution and container are evacuated to a vacuum of greater than 20 inches Hg and held in vacuum for 15 minutes, after which the containers are exposed to ambient pressure while under the dye (allowing for ingress) for 15 minutes, then are removed from the dye solution, rinsed, dried, and visually inspected. Any coloration of the water inside the container is classified as a failure. Photospectrometric methods known in the art may be used to improve the accuracy of the visual inspection, and are capable of detecting less than about 2 ppm dye in the container. Another method of maintaining failure is described in ASTM F2338-09, "Standard Test Method for Nondestructive Detection of Leaks in Packages by Vacuum Decay Method," the contents of which are incorporated by reference in their entirety. In ASTM F2338-09, leaks in the container are detected by measuring the rise in pressure in an enclosed evacuated test chamber containing the container due to leakage and/or volatilization of the liquid contents of the container.

The following examples illustrate the features and advantages of the glasses described herein and are in no way intended to limit the disclosure or appended claims thereto.

Drop tests were performed on cylindrical borosilicate glass vials (Schott Fiolax® clear) and alkaline earth aluminosilicate glass vials described in U.S. patent application Ser. No. 13/660,450. All vials studied had 3.00 ml nominal volume, 3.70 cm height, 16.75 mm diameter, and 1.1 mm wall thickness. The alkali aluminosilicate glass vials were ion exchanged in a KNO$_3$ (technical grade) salt bath at 450° C. for 8 hours. All vials were depyrogenated at 320° C. for 1 hr and cooled to a temperature of less than 90° C. before testing.

Figure 6:
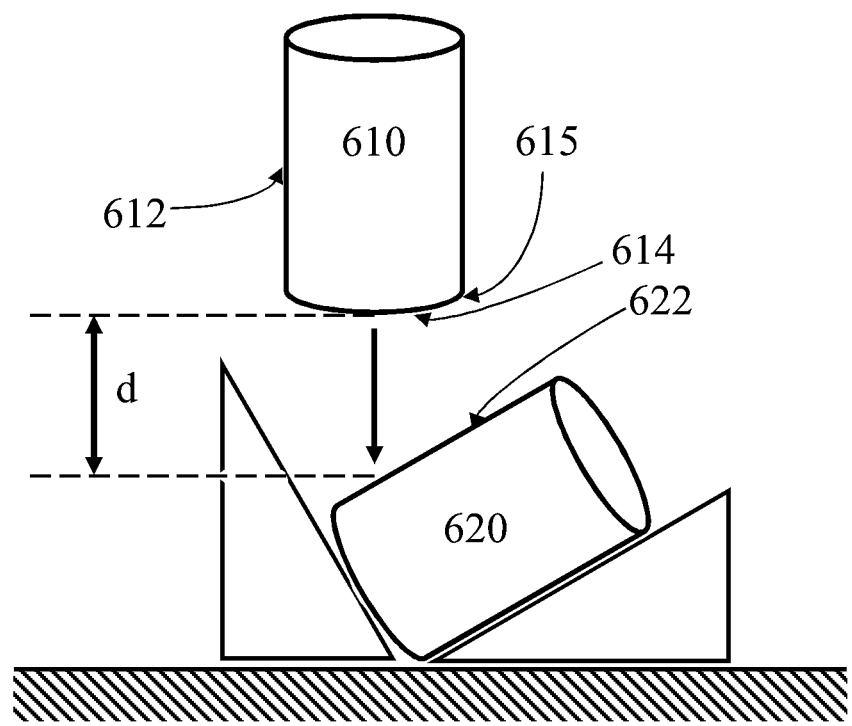
FIG. 6 is a schematic diagram of a drop test.

The drop tests were conducted as schematically shown in FIG. 6. A first vial 610 (also referred to herein as the "dropped vial") is dropped from a height d such that a portion of the "heel (i.e., the point at which the wall 612 and base 614 of the vial meet)" 615 of first vial 610 strikes a portion of the side wall 622 of a second vial 620 (also referred to herein as the "bottom vial") which is horizontally oriented (i.e., placed on its side) and inclined at ~30° from level. Both dropped vials and bottom vials had the same composition and dimensions. At least thirty vials of each glass (first vial and second vial) were dropped from a height of 8 feet. After impact both the dropped vials and bottom vials were visually inspected for damage. Damage (or failure) was classified as either superficial or "scuffing," cracking which penetrated the thickness of the vial ("through cracks"), or complete breakage or separation of the vial wall. A vial was deemed to have "survived" the drop test is the vial held and did not leak liquid after the test.

Figure 7:
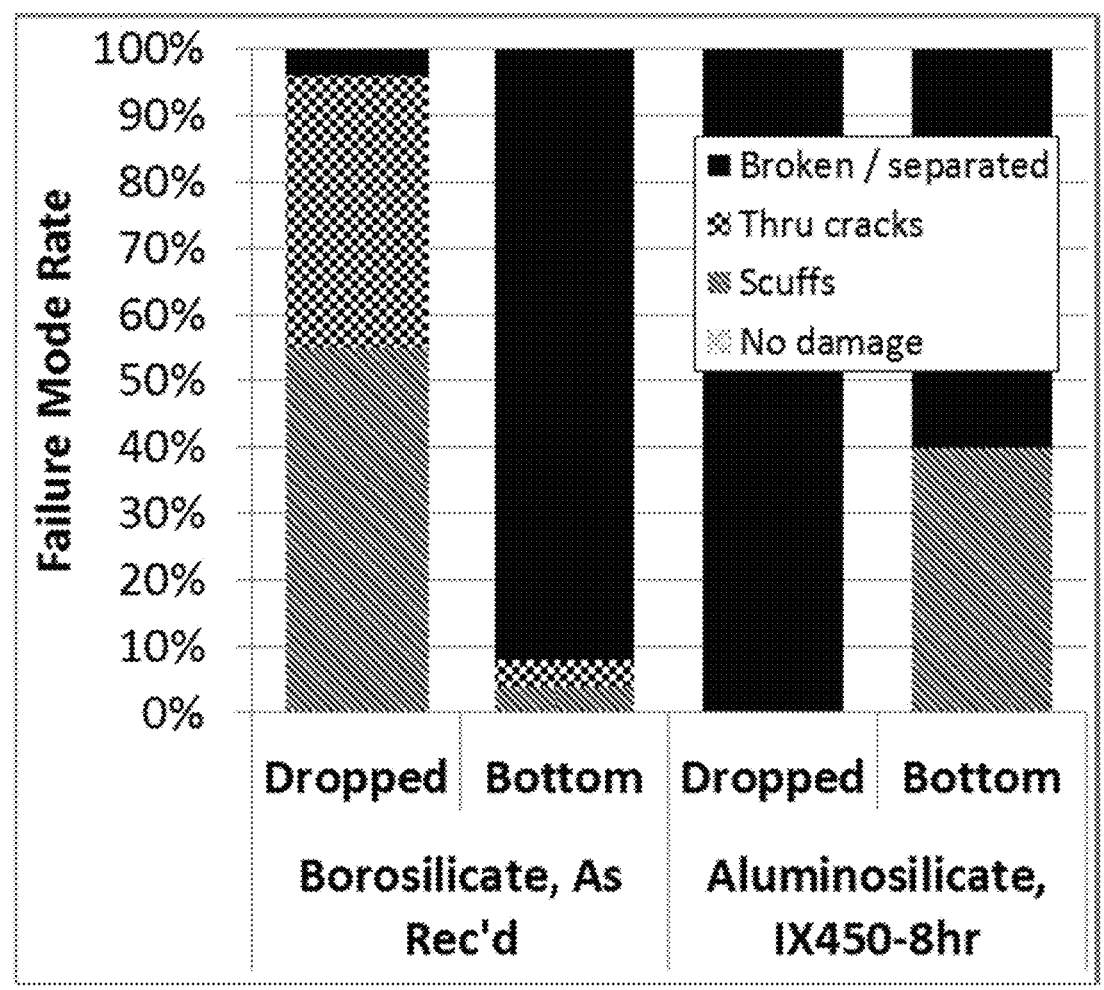
FIG. 7 is a plot of failure mode rate for dropped and bottom glass vials comparing breakage behavior for ion-exchanged alkali aluminosilicate glass and non-ion-exchanged borosilicate glass.

The frequency of each mode of damage ("failure mode rate") is plotted for dropped and bottom vials is plotted in FIG. 7 for the Type 1b borosilicate glass vials and the ion exchanged alkali aluminosilicate glass vials. The dropped borosilicate vials survived the drop test without breakage/separation at a rate of about 90%, increases the probability of compromising the integrity of the vial and making loss of integrity difficult to detect. The bottom borosilicate vials survived the drop test without breakage/separation at a rate of about 10%, making any failure that would compromise the integrity of the vial less frequent in the bottom vial. This difference in behavior is due to the drop orientation and stresses experienced during this dynamic drop test. Thus, compromised integrity could be present in about half of the population of the vials tested.

None of the dropped the ion exchanged alkali aluminosilicate glass vials exhibited a through-crack resulting from the drop test without breakage/separation, thus facilitating detection of any failure that would compromise the integrity of the dropped vial. The bottom ion exchanged alkali aluminosilicate glass vials showed the same behavior (no stable through-cracks) resulting from the drop test without breakage/separation as the dropped vials. When introduced to the alkali aluminosilicate vials, the through-cracks observed in the borosilicate glasses now result in outright breakage/separation. Compromised integrity would therefore be less likely to occur in both dropped and bottom vials of the ion exchanged alkali aluminosilicate glass, as those borosilicate glass containers having a likelihood of compromised integrity have been converted to "broken/separated" or "scuffed" in the ion exchanged alkali aluminosilicate glass population.

Figure 8:
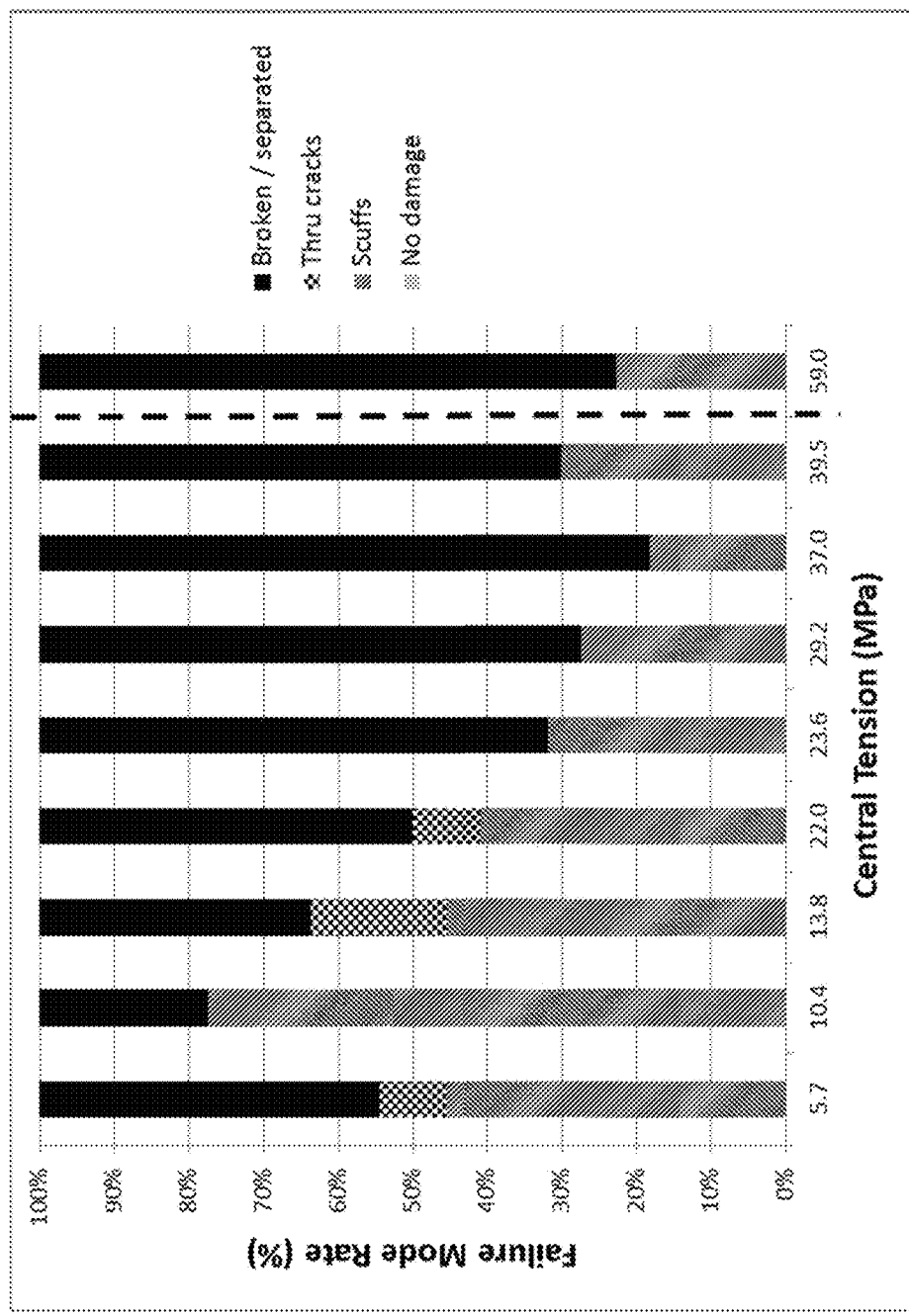
FIG. 8 is a plot of failure mode rate of glass vials as a function of central tension (corrected for stress optical coefficient (SOC), using the triangle method)

The failure mode of the ion exchanged alkali aluminosilicate glass vials is plotted as a function of central tension in FIG. 8. The vials were ion exchanged in a $KNO_3$ salt bath at 450° C. The percentage of samples that do not fail due to breakage/separation decreases from about 75% after ion exchange for less than one hour to a minimum of about 18% after ion exchange for about 15 hours. The failure (breakage/separation) rate remains relatively stable, ranging from about 70% to about 18% for central tensions ranging from about 10 MPa to about 37 MPa, which corresponds to ion exchange times ranging from 6.6 to 48 hours. Through-cracking does not occur when the central tension exceeds about 22 MPa, which corresponds to ion exchange times exceeding about 4 hours, for 1.1 mm thick samples, as the increased central tension in the central region of the vial wall drives crack propagation. Similarly, the number of samples that undergo delayed failure decreases with ion exchange time due to acceleration of crack propagation caused by increased central tension. Additionally, at CT values just above the threshold central tension, cracks may propagate at some time following the drop test (damage introduction), referred to as "delayed failure." The time to failure is less than 24 hours near the threshold CT. At slightly higher CT values, the time to failure decreases to less than one hour and, in some instances, even less than one minute. Even with delayed failure, the through-crack is never "stable." Once the flaw begins propagating due to the central tension, the flaw never stops and will lead to a condition which cannot hold fluid (i.e., separation/breakage).

Pharmaceutical Compositions

In various embodiments, the pharmaceutical container further includes a pharmaceutical composition comprising an active pharmaceutical ingredient (API). As used herein, the term "pharmaceutical composition" refers to a composition comprising an active pharmaceutical ingredient to be delivered to a subject, for example, for therapeutic, prophylactic, diagnostic, preventative or prognostic effect. In certain embodiments, the pharmaceutical composition comprises the active pharmaceutical ingredient and a pharmaceutically acceptable carrier. As used herein, "pharmaceutically acceptable carrier" includes any and all solvents, dispersion media, coatings, antibacterial and antifungal agents, isotonic and absorption delaying agents, and the like that are physiologically compatible. Examples of pharmaceutically acceptable carriers include one or more of water, saline, phosphate buffered saline, dextrose, glycerol, ethanol and the like, as well as combinations thereof. In many cases, it may be preferable to include isotonic agents, for example, sugars, polyalcohols such as mannitol, sorbitol, or sodium chloride in the composition. Pharmaceutically acceptable carriers may further comprise minor amounts of auxiliary substances such as wetting or emulsifying agents, preservatives or buffers, which enhance the shelf life or effectiveness of the active pharmaceutical agent.

As used herein, the term "active pharmaceutical ingredient" or "API" refers a substance in a pharmaceutical composition that provides a desired effect, for example, a therapeutic, prophylactic, diagnostic, preventative or prognostic effect. In various embodiments, the active pharmaceutical ingredient can be any of a variety of substances known in the art, for example, a small molecule, a polypeptide mimetic, a biologic, an antisense RNA, a small interfering RNA (siRNA), etc.

For example, in a particular embodiment, the active pharmaceutical ingredient may be a small molecule. As used herein, the term "small molecule" includes any chemical or other moiety, other than polypeptides and nucleic acids, that can act to affect biological processes. Small molecules can include any number of therapeutic agents presently known and used, or that can be synthesized from a library of such molecules for the purpose of screening for biological function(s) Small molecules are distinguished from macromolecules by size. The small molecules of the present invention usually have a molecular weight less than about 5,000 daltons (Da), preferably less than about 2,500 Da, more preferably less than 1,000 Da, most preferably less than about 500 Da.

Small molecules include, without limitation, organic compounds, peptidomimetics and conjugates thereof. As used herein, the term "organic compound" refers to any carbon based compound other than macromolecules such as nucleic acids and polypeptides. In addition to carbon, organic compounds may contain calcium, chlorine, fluorine, copper, hydrogen, iron, potassium, nitrogen, oxygen, sulfur and other elements. An organic compound may be in an aromatic or aliphatic form. Non-limiting examples of organic compounds include acetones, alcohols, anilines, carbohydrates, monosaccharides, oligosaccharides, polysaccharides, amino acids, nucleosides, nucleotides, lipids, retinoids, steroids, proteoglycans, ketones, aldehydes, saturated, unsaturated and polyunsaturated fats, oils and waxes, alkenes, esters, ethers, thiols, sulfides, cyclic compounds, heterocyclic compounds, imidizoles, and phenols. An organic compound as used herein also includes nitrated organic compounds and halogenated (e.g., chlorinated) organic compounds.

In another embodiment, the active pharmaceutical ingredient may be a polypeptide mimetic ("peptidomimetic"). As used herein, the term "polypeptide mimetic" is a molecule that mimics the biological activity of a polypeptide, but that is not peptidic in chemical nature. While, in certain embodiments, a peptidomimetic is a molecule that contains no peptide bonds (that is, amide bonds between amino acids), the term peptidomimetic may include molecules that are not completely peptidic in character, such as pseudo-peptides, semi-peptides, and peptoids.

In other embodiments, the active pharmaceutical ingredient may be a biologic. As used herein, the term "biologic" includes products created by biologic processes instead of by chemical synthesis. Non-limiting examples of a "biologic" include proteins, antibodies, antibody like molecules, vaccines, blood, blood components, and partially purified products from tissues.

The terms "peptide," "polypeptide," and "protein" are used interchangeably herein.

In the present invention, these terms mean a linked sequence of amino acids, which may be natural, synthetic, or a modification or combination of natural and synthetic. The term includes antibodies, antibody mimetics, domain antibodies, lipocalins, and targeted proteases. The term also includes vaccines containing a peptide or peptide fragment intended to raise antibodies against the peptide or peptide fragment.

"Antibody" as used herein includes an antibody of classes IgG, IgM, IgA, IgD, or IgE, or fragments or derivatives thereof, including Fab, F(ab')2, Fd, and single chain antibodies, diabodies, bispecific antibodies, and bifunctional antibodies. The antibody may be a monoclonal antibody, polyclonal antibody, affinity purified antibody, or mixtures thereof, which exhibits sufficient binding specificity to a desired epitope or a sequence derived therefrom. The antibody may also be a chimeric antibody. The antibody may be derivatized by the attachment of one or more chemical, peptide, or polypeptide moieties known in the art. The antibody may be conjugated with a chemical moiety. The antibody may be a human or humanized antibody.

Other antibody-like molecules are also within the scope of the present invention. Such antibody-like molecules include, e.g., receptor traps (such as entanercept), antibody mimetics (such as adnectins, fibronectin based "addressable" therapeutic binding molecules from, e.g., Compound Therapeutics, Inc.), domain antibodies (the smallest functional fragment of a naturally occurring single-domain antibody (such as, e.g., nanobodies; see, e.g., Cortez-Retamozo et al., Cancer Res. 2004 Apr. 15; 64 (8):2853-7)).

Suitable antibody mimetics generally can be used as surrogates for the antibodies and antibody fragments described herein. Such antibody mimetics may be associated with advantageous properties (e.g., they may be water soluble, resistant to proteolysis, and/or be nonimmunogenic). For example, peptides comprising a synthetic beta-loop structure that mimics the second complementarity-determining region (CDR) of monoclonal antibodies have been proposed and generated. See, e.g., Saragovi et al., Science. Aug. 16, 1991; 253 (5021):792-5. Peptide antibody mimetics also have been generated by use of peptide mapping to determine "active" antigen recognition residues, molecular modeling, and a molecular dynamics trajectory analysis, so as to design a peptide mimic containing antigen contact residues from multiple CDRs. See, e.g., Cassett et al., Biochem Biophys Res Commun. Jul. 18, 2003; 307 (1):198-205. Additional discussion of related principles, methods, etc., that may be applicable in the context of this invention are provided in, e.g., Fassina, Immunomethods. October 1994; 5 (2):121-9.

In various embodiments, the active pharmaceutical ingredient may have any of a variety of activities selected from the group consisting of anti-rheumatics, antineoplastic, vaccines, anti-diabetics, haematologicals, muscle relaxant, immunostimulants, anticoagulants, bone calcium regulators, sera and gammaglobulins, anti-fibrinolytics, MS therapies, anti-anaemics, cytostatics, interferons, anti-metabolites, radiopharmaceuticals, antipsychotics, anti-bacterials, immunosuppressants, cytotoxic antibiotics, cerebral & peripheral vasotherapeutics, nootropics, CNS drugs, dermatologicals, angiotensin antagonists, antispasmodics, anti-cholinergics, interferons, anti-psoriasis agents, anti-hyperlipidaemics, cardiac therapies, alkylating agents, bronchodilators, anticoagulants, anti-inflammatories, growth hormones, and diagnostic imaging agents.

In particular embodiments, the pharmaceutical composition may be selected from the group of pharmaceutical products or active pharmaceutical ingredients (API) set forth in Table 2.

TABLE 2

Approved Pharmaceutical Products

| PRODUCT | GENERIC NAME | THERAPEUTIC SUBCATEGORY |
| --- | --- | --- |
| Humira | Adalimumab | Other anti-rheumatics |
| Trelstar | Triptolerin Pamoate | a gonadotropin releasing hormone agonist |
| Veletri | Epoprostenol | Pulmonary Arterial Hypertension |
| Soliris | Eculizumab | Other haematologicals |
| Vivitrol | Naltrexone | Anti-addiction |
| Risperdal Consta | Risperisone | Schizophrenia, Biopolar |
| Invega Sustenna | Paliperdone Palmitate | Schizophrenia, Biopolar |
| Botox | botulinum toxin type A | Muscle relaxant, peripheral |
| Enbrel | Etanercept | Other anti-rheumatics |
| Neulasta | Pegfilgrastim | Immunostimulants |
| Xgeva | Denosumab | Bone calcium regulators |
| Prolia | Denosumab | Bone calcium regulators |
| Aranesp | Darbepoetin Alfa | Anemia |
| Lexiscan | Regadenoson | Anti-organ rejection |
| Ambisome | Amphotericin B | Anti-fungal |
| Prograf | Tacolimus | calcineurin-inhibitor immunosuppressant |
| Mycamine | Micafungin Sodium | Anti-fungal |
| Bydureon | exenatide synthetic | Anti-diabetics |
| Nexium | Esomeprazole magnesium | Proton pump inhibitor |
| Diprivan | Propofol | Neuroscience |
| Gammagard Liquid | immune globulin (human) | Sera & gammaglobulins |
| Advate | factor VIII (procoagulant) | Anti-fibrinolytics |
| Kogenate | octocog alfa | Anti-fibrinolytics |
| Insugen 30/70 | Insulin | Diabetes |
| Avonex | interferon beta-1a | MS Therapies |
| Tysabri | Natalizumab | MS Therapies |
| Naglazyme | Galsulfase | Enzyme replacement therapy |
| XIAFLEX | Collagenase | Dupuytren's contracture and Peyronie's Disease |
| Actilyse | Alteplase | Anti-fibrinolytics |
| Metalyse | Tenecteplase | Anti-fibrinolytics |
| Orencia | Abatacept | Aflibercept |
| Yervoy | Ipilimumab | Anti-neoplastic MAbs |
| Erbitux | Ceutximab | Oncology mAb |
| Abilify | Aripiprozole | Schizophrenia, Biopolar |
| Nulojix | Belatacept | Anti-organ transplant rejection |
| Abraxane | paclitaxel protein-bound particles | microtubule inhibitor indicated for metastaic cancer |
| Isodax | Romidespsin | histone deacetylase (HDAC) inhibitor |

TABLE 2-continued

Approved Pharmaceutical Products

| PRODUCT | GENERIC NAME | THERAPEUTIC SUBCATEGORY |
|---|---|---|
| Human Immunoglobin | Human Immunoglobin | Treatment of primary immunoglobulin deficiencies |
| Privigen | immune globulin (human) | Sera & gammaglobulins |
| Cubicin | Daptomycin | Anti-Infection |
| Sivextro | Tedizolid Phosphate | Anti-Infection |
| Ambisome | Amphotericin B | Anti-fungal |
| Fragmin | Dalteparin | ischemic complications |
| Humalog | insulin lispro recombinant | Anti-diabetics |
| Humulin R | insulin (human) | Anti-diabetics |
| Forteo | Teriparatide recombinant human | Bone calcium regulators |
| Aveed | Testosterone Undeconate | Testosterone replacement therapy |
| Delatestryl | Testosterone Enanthate | Testosterone replacement therapy |
| Opana | Oxymorphone Hydrochloride | semi-synthetic opioid analgesic |
| Dexamethasone | Dexamethasone | Immunsuppresent |
| Avastin | Bevacizumab | Anti-neoplastic MAbs |
| Rituxan | Rituximab | Anti-neoplastic MAbs |
| Herceptin | Trastuzumab | Anti-neoplastic MAbs |
| Perjeta | Pertuzumab | Anti-neoplastic MAbs |
| Actemra | Tocilizumab | Other anti-rheumatics |
| Lucentis | Ranibizumab | Eye preparations |
| Defibrotide | defibrotide | Cerebral & peripheral vasotherapeutics |
| Lexiscan | Regadenoson | Anti-organ rejection |
| Ambisome | Amphotericin B | Anti-fungal |
| Pediarix | DTP, hepatitis B & polio vaccine | Vaccines |
| Arixtra | Fondapaurinix Sodium | Prophylaxis Of Deep Vein Thrombosis |
| Havrix | Hep A Vaccoe | Hepatitis A |
| Gamunex IGIV | immune globulin (human) | Sera & gammaglobulins |
| Hylenex | Recombinant Hyalurondinase | Hydration |
| Infectra | Infliximab | Immunosuppressants |
| Somatuline | Lanreotide | long-term treatment of acromegaly |
| Dysport | Abobotulinumtoxin A | cervical dystonia and glabellar lines |
| Remicade | Infliximab | Other anti-rheumatics |
| Stelara | Ustekinumab | Immunosuppressants |
| Simponi | Golimumab | Other anti-rheumatics |
| Navelbine | Vinorelbine | Chemotherapy |
| Venofer/Hemilift | Iron Sucrose | Supplement |
| Clopixol | Zuclopenthixol | Antipsychotic |
| Berlinsulin H | Insulin | Diabetes |
| Firmacef | Semisynthetic Cephalosporin Analog | Antibiotics |
| Liprolog | insulin lispro | Diabetes |
| Gardasil | Human papillomavirus (HPV) vaccine | Vaccines |
| Rebif | interferon beta-1a | MS Therapies |
| Flubik HA | influenza vaccine | Vaccines |
| Epipen | Epinephrine | Cardiovasular |
| Lucentis | Ranibizumab | Eye preparations |
| NovoRapid | insulin aspart | Anti-diabetics |
| Victoza | Liraglutide | Anti-diabetics |
| NovoMix 30 | insulin; insulin aspart | Anti-diabetics |
| NovoSeven | eptacog alfa | Anti-fibrinolytics |
| Levemir | insulin detemir | Anti-diabetics |
| Gattex | Teduglutide | Short Bowel Sndrom |
| Kyprolis | Carfilzomib | Other cytostatics |
| Meylon | Sodium Bicarbonate | Electrolytes |
| Asering | Acetate, calcium, chloride | Fluid replacement therapy |
| Prevnar 13 | pneumococcal vaccine | Vaccines |
| Rebif | interferon beta-1a | MS Therapies |
| Benefix | Coagulation Factor IX | Hemophilia |
| Fragmin | Dalteparin | ischemic complications |
| Xyntha | Antihemophilic Factor | Hemophilia |
| Oframax | Ceftriaxone | Antibiotics |
| Eylea | Aflibercept | Eye preparations |
| Lantus | insulin glargine recombinant | Anti-diabetics |
| Lovenox | enoxaparin sodium | Anti-coagulants |
| PENTAct-HIB | DTPw, Hib & polio vaccine | Vaccines |
| Fluzone/Vaxigrip | influenza vaccine | Vaccines |
| Apidra | Insulin | Anti-diabetics |
| Vaxigrip | influenza vaccine | Vaccines |
| Adcetris | brentuximab vedotin | Anti-neoplastic MAbs |
| Finibax | Doripenem | Anti-Infection |

TABLE 2-continued

Approved Pharmaceutical Products

| PRODUCT | GENERIC NAME | THERAPEUTIC SUBCATEGORY |
| --- | --- | --- |
| Flumarin | Flumozef + Morniflumate | Anti-Infection |
| Crystapen | Benzylpenicillin | Anti-Infection |
| Velcade | Bortezomib | Other cytostatics |
| Copaxone | glatiramer acetate | MS Therapies |
| Copaxone | glatiramer acetate | MS Therapies |
| Cimzia | certolizumab pegol | Other anti-rheumatics |
| Keppra | Levetiracetam | Epilespy |
| Viridal | Alprostadil | Erectile Dysfunction |
| Remodulin | Trepostinil | Pulmonary Arterial Hypertension |
| Corhydron | Hydrocortison | Glucocorticoids |
| Daunoxome | Daunorubin Citrate | Chemotherapy |

In particular embodiments, the pharmaceutical composition may be selected from the group of pharmaceutical products or active pharmaceutical ingredients (API) set forth in Table 3.

TABLE 3

Pharmaceutical Products in Development

| PRODUCT | GENERIC NAME | THERAPEUTIC SUBCATEGORY |
| --- | --- | --- |
| Daclizumab | daclizumab | MS Therapies |
| AEZS-108 | — | Other cytostatics |
| Asfotase Alpha | — | Hypophosphatasia |
| ALXN1101 | — | cPMP Replacement Therapy |
| ALXN1007 | — | Antiphospholipid Syndrome |
| AGN 150998 | Anti-VEGF DARPin | Age-Related Macular Degeneration |
| AGN 208397 | — | Retinal Disease |
| AMG 785 (CDP7851) | romosozumab | Bone calcium regulators |
| AMG 403 | fulranumab | Non-narcotic analgesics |
| AMG 386 | Trebanib | Anti-angiopoietin |
| AMG 416 | Velcalcetide | Peptide agonist of the human cell surface calcium-sensing receptor |
| Rilotumumab | Rilotumumab | Oncology mAb |
| Blisibimod | blisibimod | Immunosuppressants |
| MDV3100 | Enzalutamide | Androgen Receptor Inhibitor |
| Zinforo | ceftaroline fosamil | Anti-bacterials |
| Medi-551 | — | Humanized Monoclonal Anti-CD19 |
| CAZ-AVI | antibiotic ceftazidime-avibactam | Antibiotics |
| Baxter/Asklepios Haemophilia Gene Therapy | — | Anti-fibrinolytics |
| BAX 111 | vonicog alfa | Anti-fibrinolytics |
| CD34+ adult stem cells | CD34+ adult stem cells | Gene Therapy |
| Alpharadin | radium Ra-223 chloride | Radiopharmaceuticals |
| BAY94-9027 | Recombinant VIII Factor | Hemophilia A |
| Nimotuzumab | Nimotuzumab | EGFR binding mAb |
| Itolizumab | Itolizumab | CD6 binding mAb |
| PEGylated-IFN β-1a | peginterferon beta-1a | MS Therapies |
| Daclizumab | daclizumab | MS Therapies |
| rFVIIIFc | factor VIII | Anti-fibrinolytics |
| GALNS | elosulfase alfa | Other therapeutic products |
| BMN 165 | PEG-PAL | PKU |
| BMN 701 | GIL GAA | Pompe Disease |
| BiovaxID | — | Other cytostatics |
| BI 6727 | Volasertib | Acute Myeloid Leukemia |
| PEG-IFN-lambda | peginterferon lambda-1a | Interferons |
| BMS-901608 | elotuzumab | Anti-neoplastic MAbs |
| ONO-4538/BMS-936558 | nivolumab | Anti-neoplastic MAbs |
| BMS-247550 | Ixabepilone | Chemotherapy |
| ACE-011 | Sotatercept | activin receptor type 2A IgG-Fc fusion protein |
| ACE-536 | LUSPATERCEPT | Fusion protein that inhibits members of the TGF-β |

TABLE 3-continued

Pharmaceutical Products in Development

| PRODUCT | GENERIC NAME | THERAPEUTIC SUBCATEGORY |
|---|---|---|
| ThermoDox | doxorubicin hydrochloride | Cytotoxic antibiotics |
| Brilacidin (IV) | brilacidin | Anti-bacterials |
| Kevetrin | thioureidobutyronitrile | p53 activator - tumor suppresor |
| Human Hep B Immunoglobin | Human Hep B Immunoglobin | Hepatitus B |
| Protectan CBLB502 | — | Other therapeutic products |
| CBL0137 | — | NF-kB suppression |
| CSL 654 | — | Hemophilia |
| CSL 627 | — | Hemophilia |
| TR-701 IV | tedizolid phosphate | Anti-bacterials |
| CXA-201 | ceftolozane sulfate; tazobactam sodium | Anti-bacterials |
| CUDC-101 | — | Other cytostatics |
| DE-766 | Nimotuzumab | Oncology mAb |
| U3-1287 | Partitumab | Oncology mAb |
| Heplisav | hepatitis B vaccine | Vaccines |
| DV1179 | — | Systemic lupus erythematosus |
| E5564 | eritoran tetrasodium | Immunosuppressants |
| MORab-0004 | — | Oncology |
| MORab-0003 | — | Platinum-senstive ovarian cancer |
| MORab-0009 | — | Mesothelioma |
| Dulaglutide | dulaglutide | Anti-diabetics |
| Ramucirumab | ramucirumab | Anti-neoplastic MAbs |
| Solanezumab | solanezumab | Nootropics |
| Ixekizumab | ixekizumab | Anti-psoriasis agents |
| Tabalumab | tabalumab | Other anti-rheumatics |
| Necitumumab | necitumumab | Anti-neoplastic MAbs |
| IMC-A12 | cixutumumab | Anti-neoplastic MAbs |
| ENB-0040 | asfotase alfa | Other musculoskeletal agents |
| Trastuzumab-DM1 | trastuzumab emtansine | Anti-neoplastic MAbs |
| RG3638 | onartuzumab | Anti-neoplastic MAbs |
| RG7159/GA101 | obinutuzumab | Anti-neoplastic MAbs |
| RG1594 | ocrelizumab | MS Therapies |
| RG3637/TNX-650 | lebrikizumab | Other bronchodilators |
| Trastuzumab-DM1 | trastuzumab emtansine | Anti-neoplastic MAbs |
| RG1273 | pertuzumab | Anti-neoplastic MAbs |
| GRN163L | imetelstat sodium | Other cytostatics |
| Simtuzumab | Simtuzumab | Idiopathic Pulmunary Antibody |
| GS-5745 | — | MMP9 Mab inhibitor |
| Albiglutide | albiglutide | Anti-diabetics |
| MAGE-A3 | astuprotimut-R | Other cytostatics |
| GSK2402968 | drisapersen | Other musculoskeletal agents |
| HZ/su | herpes zoster vaccine | Vaccines |
| Otelixizumab | Otelixizumab | Diabetes |
| Analog Insulin-PH20 | hyaluronidase (human); insulin | Anti-diabetics |
| PEGPH20 | — | Pancreatic Cancer |
| ICT-107 | — | Other cytostatics |
| ICT-121 | — | Oncology Vaccine |
| ICT-140 | — | Oncology Vaccine |
| IMMU-107 | yttrium Y-90 clivatuzumab tetraxetan | Anti-neoplastic MAbs |
| Epratuzumab | Epratuzumab | Systemic lupus erythematosus |
| IMMU-132 | — | Antibody conjugate for metastaticsolid tumors |
| IMMU-130 | — | mCRC |
| IPI-504 | retaspimycin hydrochloride | Other cytostatics |
| ISIS-APOCIII | — | Antisense Drug |
| ISIS-SMN | — | Antisense Drug |
| Siltuximab | siltuximab | Anti-neoplastic MAbs |
| Ibrutinib | Ibrutinib | Oncology |
| JNJ-42160443 | fulranumab | Anti-nerve growth factor mAb |
| Bapineuzumab | Bapineuzumab | Alzheimer's Disease |
| V503 | human papillomavirus (HPV) vaccine | Vaccines |
| Tecemotide | Tecemotide | Oncology Vaccine |
| MT-2301 | Hib influenza vaccine | Vaccines |
| Influenza Vaccine | Plant-based VLP Vaccine | Vaccines |
| GB-1057 | Recombinant human serum albumin | Hematology |

TABLE 3-continued

Pharmaceutical Products in Development

| PRODUCT | GENERIC NAME | THERAPEUTIC SUBCATEGORY |
|---|---|---|
| RigScan CR | minretumomab | Diagnostic imaging |
| NAV 4694 | Flourine-18 | Radiopharmaceuticals |
| NAV 5001 | — | Radiopharmaceuticals |
| HyperAcute Pancreas | algenpantucel-L | Other cytostatics |
| CD-NP | cenderitide | Cardiac therapy |
| Bexsero | meningococcal B vaccine | Vaccines |
| AIN457 | secukinumab | Other dermatologicals |
| Relaxin | serelaxin | Angiotensin II antagonists |
| Tresiba | insulin degludec | Anti-diabetics |
| Ryzodeg | insulin aspart; insulin degludec | Anti-diabetics |
| Turoctocog alfa | turoctocog alfa | Anti-fibrinolytics |
| IDegLira | insulin degludec; liraglutide | Anti-diabetics |
| NPSP795 | — | Antagonist of the calcium-sensing receptor |
| Natpara | parathyroid hormone 1-84 [rdna origin] | Other hormone preparations |
| Reolysin | — | Other cytostatics |
| hGH-CTP (MOD-4023) | growth hormone (human) | Growth hormones |
| Abilify Depot | aripiprazole | Anti-psychotics |
| OTS102 | Elpamotide | Angiogensis Inhibitor |
| Tanezumab | Tanezumab | Osteoarthritis |
| LP2086 | Bivalent meningococcal B vaccine targeting LP2086 | Vaccines |
| PF-00547659 | — | Anti-Inflammation |
| Ponezumab | Ponezumab | Alzheimer's Disease |
| Bavituximab | bavituximab | Anti-neoplastic MAbs |
| Cotara | — | Tumor Necrosis Therapy |
| REGN727/SAR236553 | alirocumab | Anti-hyperlipidaemics |
| Sarilumab | sarilumab | Other anti-rheumatics |
| Soluble Ferric Pyrophosphate | ferric pyrophosphate | Anti-anaemics |
| Lyxumia | lixisenatide | Anti-diabetics |
| New insulin glargine product | insulin glargine recombinant | Anti-diabetics |
| Lemtrada | alemtuzumab | MS Therapies |
| REGN727/SAR236553 | alirocumab | Anti-hyperlipidaemics |
| SAR2405550/BSI-201 | iniparib | Other cytostatics |
| Otamixaban | otamixaban | Anti-coagulants |
| Sarilumab | sarilumab | Other anti-rheumatics |
| Lantus + Lixisenatide | insulin glargine; lixisenatide | Anti-diabetics |
| Visamerin/Mulsevo | semuloparin sodium | Anti-coagulants |
| AVI-4658 | eteplirsen | Other musculoskeletal agents |
| Brentuximab Vedotin | Brentuximab Vedotin | Anti-neoplastic MAbs |
| SGN-CD70A | — | Antibody-drug conjugate targeted to CD70 |
| SGN-CD19A | — | Antibody-drug conjugate targeted to CD19 |
| SGN-CD33A | — | Antibody-drug conjugate targeted to CD33 |
| ASG-22ME | — | Antibody-drug conjugate (ADC) targeting Nectin-4 |
| ASG-15ME | — | Antibody-drug conjugate (ADC) targeting SLTRK6 |
| S-649266 | Cephem Antibiotic | Anti-Infection |
| S-288310 | — | Cancer Peptide Vaccine |
| S-488410 | — | Cancer Peptide Vaccine |
| S-488210 | — | Cancer Peptide Vaccine |
| S-646240 | — | Peptide Vaccine |
| HGT 1110 | — | Other therapeutic products |
| HGT-1410 | — | Other therapeutic products |
| Vosaroxin | vosaroxin | Other cytostatics |
| HuCNS-SC | neural stem cells (human) | Other CNS drugs |
| SBC-102 | sebelipase alfa | Other therapeutic products |
| Ganetespib | ganetespib | Other cytostatics |
| Vedolizumab | vedolizumab | Gastro-intestinal anti-inflammatories |
| Brentuximab Vedotin | Brentuximab Vedotin | Anti-neoplastic MAbs |
| Lipegfilgrastime | Lipegfilgrastime | Hematology |
| Jetrea | ocriplasmin | Eye preparations |
| TH-302 | — | Alkylating agents |
| Epratuzumab | epratuzumab | Immunosuppressants |
| Romosozumab | Romosozumab | Osteoporosis |
| UCB4940 | — | Immunological Diseases |
| UCB5857 | — | Immunological Diseases |
| UCB7665 | — | Immunological Diseases |

TABLE 3-continued

Pharmaceutical Products in Development

| PRODUCT | GENERIC NAME | THERAPEUTIC SUBCATEGORY |
| --- | --- | --- |
| CDP7657 | — | Systemic lupus erythematosus |
| Allovectin-7 | velimogene aliplasmid | Other cytostatics |
| Zymafos | palifosfamide | Alkylating agents |
| Ad-RTS-IL-12 | — | Brain Cancer |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A sterile packaged pharmaceutical composition comprising: a sterile pharmaceutical container comprising a delamination resistant glass and a sterile pharmaceutical composition contained in the sterile pharmaceutical container;
wherein the sterile pharmaceutical container comprises a first surface and a second surface separated by glass having a thickness;
a first region under a compressive stress, the first region extending from at least one of the first surface or the second surface to a depth of layer in the glass of at least about 10 µm;
a second region under a central tension of at least about 15 MPa, the second region extending from the depth of layer, wherein the central tension is greater than a threshold central tension that is sufficient to allow self-propagation of a crack front through the thickness from the first surface to the second surface which renders the pharmaceutical container unsuitable for its intended use such that the pharmaceutical composition remains sterile so long as the crack front does not extend into the second region; and
wherein the delamination resistant glass comprises a laminate, the laminate comprising a first glass disposed on the first surface and a second glass disposed between the first glass and the second surface.

2. The sterile pharmaceutical container of claim 1, wherein the delamination resistant glass comprises an alkali aluminosilicate glass.

3. The sterile pharmaceutical container of claim 1, wherein the sterile pharmaceutical composition is a vaccine, a biologic, or a solution comprising an active pharmaceutical ingredient.

4. The sterile pharmaceutical container of claim 1, wherein the self-propagation of the crack front from the first surface to the second surface further comprises bifurcation of the crack front across at least the first surface.

5. The sterile pharmaceutical container of claim 1, wherein the self-propagation of the crack front from the first surface to the second surface further comprises self-propagation of the crack front laterally across at least the first surface, and wherein the self-propagation of the crack front renders the pharmaceutical container unsuitable for its intended use.

6. The sterile pharmaceutical container of claim 1, wherein $(CT^2/E) \cdot (t-2DOL) \cdot (1-v) \geq 9.5$ MPa·µm.

7. The sterile pharmaceutical container of claim 6, wherein $(CT^2/E) \cdot (t-2DOL) \cdot (1-v) \geq 15.0$ MPa·µm.

8. The sterile pharmaceutical container of claim 1, wherein the central tension is greater than or equal to about 30 MPa.

9. The sterile pharmaceutical container of claim 8, wherein the central tension is greater than or equal to about 45 MPa.

10. The sterile pharmaceutical container of claim 1, wherein the compressive stress is at least about 200 MPa.

11. The sterile pharmaceutical container of claim 1, wherein the depth of layer is at least about 30 µm.

12. The sterile pharmaceutical container of claim 1, wherein the depth of layer is in a range from about 15% to about 25% of the thickness.

13. The sterile pharmaceutical container of claim 1, wherein the thickness is up to about 6 mm.

14. The sterile pharmaceutical container of claim 13, wherein the thickness is in a range from about 0.3 mm to about 2.0 mm.

15. The sterile packaged pharmaceutical composition of claim 1, wherein the first glass has a first CTE and the second glass is adjacent to the first glass and has a second CTE, wherein the first CTE is greater than the second CTE.

16. The sterile packaged pharmaceutical composition of claim 1, wherein the first glass has a first Young's modulus and the second glass is adjacent to the first glass and has a second Young's modulus, wherein the first Young's modulus is greater than the second Young's modulus.

17. A sterile packaged pharmaceutical composition comprising: a sterile pharmaceutical container comprising a delamination resistant glass and a sterile pharmaceutical composition contained in the sterile pharmaceutical container comprising:
an active pharmaceutical ingredient; and
wherein the sterile pharmaceutical container comprises:
a first surface and a second surface separated by glass having a thickness;
a first region under a compressive stress, the first region extending from at least one of the first surface and the second surface to a depth of layer in the glass of at least about 10 µm; and
a second region under a central tension of at least about 15 MPa, the second region extending from the depth of layer, wherein the central tension is greater than a central tension that is sufficient to allow self-propagation of a crack front through the thickness from the first surface to the second surface which renders the pharmaceutical container unsuitable for its intended use such that the active pharmaceutical ingredient remains sterile so long as the crack front does not extend into the second region; and
wherein the glass comprises a laminate, the laminate comprising a first glass disposed on the first surface and a second glass disposed between the first glass and the second surface.

18. The sterile packaged pharmaceutical composition of claim 17, wherein the glass comprises an alkali aluminosilicate glass.

19. The sterile packaged pharmaceutical composition of claim 17, wherein the self-propagation of the crack front from the first surface to the second surface further comprises bifurcation of the crack front across at least the first surface.

20. The sterile packaged pharmaceutical composition of claim 19, wherein the self-propagation of the crack front from the first surface to the second surface further comprises self-propagation of the crack front laterally across at least the first surface, and wherein the self-propagation of the crack front renders the container unsuitable for its intended use.

21. The sterile packaged pharmaceutical composition of claim 17, wherein $(CT^2/E)\cdot(t-2DOL)\cdot(1-v)\geq 9.5$ MPa·μm.

22. The sterile packaged pharmaceutical composition of claim 21, wherein $(CT^2/E)\cdot(t-2DOL)\cdot(1-v)\geq 15.0$ MPa·μm.

23. The sterile packaged pharmaceutical composition of claim 17, wherein the threshold tensile stress is greater than or equal to about 30 MPa.

24. The sterile packaged pharmaceutical composition of claim 23, wherein the threshold tensile stress is greater than or equal to about 45 MPa.

25. The sterile packaged pharmaceutical composition of claim 17, wherein the compressive stress is at least about 200 MPa.

26. The sterile packaged pharmaceutical composition of claim 17, wherein the depth of layer is at least about 30 pna.

27. The sterile packaged pharmaceutical composition of claim 17, wherein the depth of layer is in a range from about 15% to about 25% of the thickness.

28. The sterile packaged pharmaceutical composition of claim 17, wherein the thickness is up to about 6 mm.

29. The sterile packaged pharmaceutical composition of claim 28, wherein the thickness is in a range from about 0.3 mm to about 2.0 mm.

30. The sterile packaged pharmaceutical composition of claim 17, wherein the first glass has a first CTE and the second glass is adjacent to the first glass and has a second CTE, wherein the first CTE is greater than the second CTE.

31. The sterile packaged pharmaceutical composition of claim 17, wherein the first glass has a first Young's modulus and the second glass is adjacent to the first glass and has a second Young's modulus, wherein the first Young's modulus is greater than the second Young's modulus.

* * * * *

UNITED STATES PATENT AND TRADEMARK OFFICE
CERTIFICATE OF CORRECTION

PATENT NO. : 10,350,139 B2
APPLICATION NO. : 14/573606
DATED : July 16, 2019
INVENTOR(S) : Steven Edward DeMartino et al.

Page 1 of 1

It is certified that error appears in the above-identified patent and that said Letters Patent is hereby corrected as shown below:

In the Claims

In Column 34, Line 46, Claim 17, delete "ingredient;" and insert -- ingredient --, therefor.

In Column 36, Line 5, Claim 26, delete "pna." and insert -- µm. --, therefor.

Signed and Sealed this
Nineteenth Day of November, 2019

Andrei Iancu
*Director of the United States Patent and Trademark Office*